(12) United States Patent
Rungta et al.

(10) Patent No.: US 10,977,111 B2
(45) Date of Patent: Apr. 13, 2021

(54) CONSTRAINT SOLVER EXECUTION SERVICE AND INFRASTRUCTURE THEREFOR

(71) Applicant: Amazon Technologies, Inc., Seattle, WA (US)

(72) Inventors: Neha Rungta, San Jose, CA (US); Temesghen Kahsai Azene, San Francisco, CA (US); Pauline Virginie Bolignano, London (GB); Kasper Soe Luckow, Sunnyvale, CA (US); Sean McLaughlin, Seattle, WA (US); Catherine Dodge, Seattle, WA (US); Andrew Jude Gacek, Maple Grove, NM (US); Carsten Varming, Brooklyn, NY (US); John Byron Cook, Brooklyn, NY (US); Daniel Schwartz-Narbonne, Brooklyn, NY (US); Juan Rodriguez Hortala, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 16/115,408

(22) Filed: Aug. 28, 2018

(65) Prior Publication Data
US 2020/0073739 A1 Mar. 5, 2020

(51) Int. Cl.
*G06F 11/07* (2006.01)
*G06F 11/14* (2006.01)
(Continued)

(52) U.S. Cl.
CPC ............ *G06F 11/079* (2013.01); *G06F 8/60* (2013.01); *G06F 9/451* (2018.02);
(Continued)

(58) Field of Classification Search
CPC ............ G06F 11/3668; G06F 11/3672; G06F 11/3664; G06F 11/079; G06F 11/0712; G06F 9/45558
See application file for complete search history.

(56) References Cited

U.S. PATENT DOCUMENTS

| 5,651,111 A | 7/1997 | McKeeman et al. |
| 8,261,126 B2 | 9/2012 | Sosnosky et al. |

(Continued)

OTHER PUBLICATIONS

David Wells, "Five Key Benefits of Going Serverless", Aug. 2018, https://www.netlify.com/blog/2018/08/06/five-key-benefits-of-going-serverless (Year: 2018).

(Continued)

*Primary Examiner* — Jigar P Patel
(74) *Attorney, Agent, or Firm* — Nicholson De Vos Webster & Elliott LLP

(57) ABSTRACT

A constraint solver service of a computing resource service provider performs evaluations of logic problems provided by the service provider's users and/or services by deploying a plurality of constraint solvers to concurrently evaluate the logic problem. Each deployed solver has, or is configured with, different characteristics and/or capabilities than the other solvers; thus, the solvers can have varying execution times and ways of finding a solution. The service may control execution of the solvers using virtual computing resources, such as by installing and configuring a solver to execute in a software container instance. The service receives solver results and delivers them according to a solution strategy such as "first received" to reduce latency or "check for agreement" to validate the solution. An interface allows the provider of the logic problem to select and configure solvers, issue commands and modifications during solver execution, select the solution strategy, and receive the solution.

20 Claims, 21 Drawing Sheets

(51) Int. Cl.
   *G06F 9/50*    (2006.01)
   *G06F 9/451*   (2018.01)
   *G06F 8/60*    (2018.01)
   *G06F 9/455*   (2018.01)
   *G06F 11/36*   (2006.01)

(52) U.S. Cl.
   CPC ........ *G06F 9/45558* (2013.01); *G06F 9/5077* (2013.01); *G06F 11/1484* (2013.01); *G06F 11/3668* (2013.01); *G06F 11/3672* (2013.01); *G06F 2009/45562* (2013.01)

(56) References Cited

U.S. PATENT DOCUMENTS

| | | |
|---|---|---|
| 8,914,679 B2 | 12/2014 | Apostoloiu et al. |
| 9,032,373 B1 | 5/2015 | Gupta et al. |
| 2005/0283761 A1 | 12/2005 | Haas |
| 2007/0061782 A1 | 3/2007 | Schreiner et al. |
| 2007/0174741 A1 | 7/2007 | Vasudevan |
| 2010/0209099 A1* | 8/2010 | Eiger .................. H04J 14/0257 398/2 |
| 2014/0282421 A1 | 9/2014 | Jubran et al. |
| 2014/0304685 A1* | 10/2014 | Xie ..................... G06F 9/45558 717/124 |
| 2015/0170417 A1* | 6/2015 | Palm ...................... G06T 15/20 345/633 |
| 2016/0335586 A1* | 11/2016 | Panchamgam ...... G06Q 10/087 |
| 2017/0364432 A1 | 12/2017 | Nishi |
| 2018/0075647 A1 | 3/2018 | Kim et al. |
| 2018/0088993 A1 | 3/2018 | Gerdesmeier et al. |

OTHER PUBLICATIONS

Boerman Jan et al, Reasoning About JML: Differences Between KeY and OpenJML, IFM 2018, LNCS 11023, pp. 30-46, Springer, Berlin.

* cited by examiner

CONSTRAINT SOLVER EXECUTION SERVICE AND INFRASTRUCTURE THEREFOR

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently. For example, a virtual machine may emulate the computing architecture (i.e., hardware and software) and provide the functionality of a complete general or specifically-configured physical computer.

In turn, users can request computer resources from a data center, including single computing devices or a configuration of networked computing devices, and be provided with varying types and amounts of virtualized computing resources. Virtualization can scale upward from virtual machines; entire data centers and even multiple data centers may implement computing environments with varying capacities, such as a virtual private network and a virtual private cloud. Virtualization can also scale downward from virtual machines; a software container is a lightweight, virtualized execution environment typically configured for a particular application. Containers allow for easily running and managing applications across a cluster of servers or virtual machines; applications packaged as containers can be deployed across a variety of environments, such as locally and within a compute service. Containers can also execute within a virtual machine; compute services may provision virtual machines to host containers on behalf of customers, thereby eliminating the need to install, operate, and scale a cluster management infrastructure.

Development efforts in the field of theoretical computer science have produced software and software/hardware applications, known as "constraint solvers," that automatically solve complex logic problems. A constraint solver can be used to prove or check the validity and/or satisfiability of logical formulae that define a solution to a constraint satisfaction problem presented to the constraint solver and expressed in a format known to the solver. Examples of constraint solvers include Boolean satisfiability problem (SAT) solvers, satisfiability modulo theories (SMT) solvers, and answer set programming (ASP) solvers. Many constraint solvers are academic projects, and are non-trivial for a user to install and manage. Executing a constraint solver requires significant computing power and memory. A constraint solver can have a set of features that each may be enabled or disabled, and may accept further configuration of functionality, in order to optimize the processing of certain kinds of problems presented as "queries" to the solver. Further, different constraint solvers of a given type may have different strengths and weaknesses with respect to processing logic problems. It is difficult to predict the runtime of a query on any particular solver configuration: the runtime can vary by orders of magnitude (e.g., from seconds to hours or even days) depending on the selection of a solver, its enabled features, the logical theories it uses, and other changes.

BRIEF DESCRIPTION OF THE DRAWINGS

Various techniques will be described with reference to the drawings, in which.

DETAILED DESCRIPTION

Figure 1:
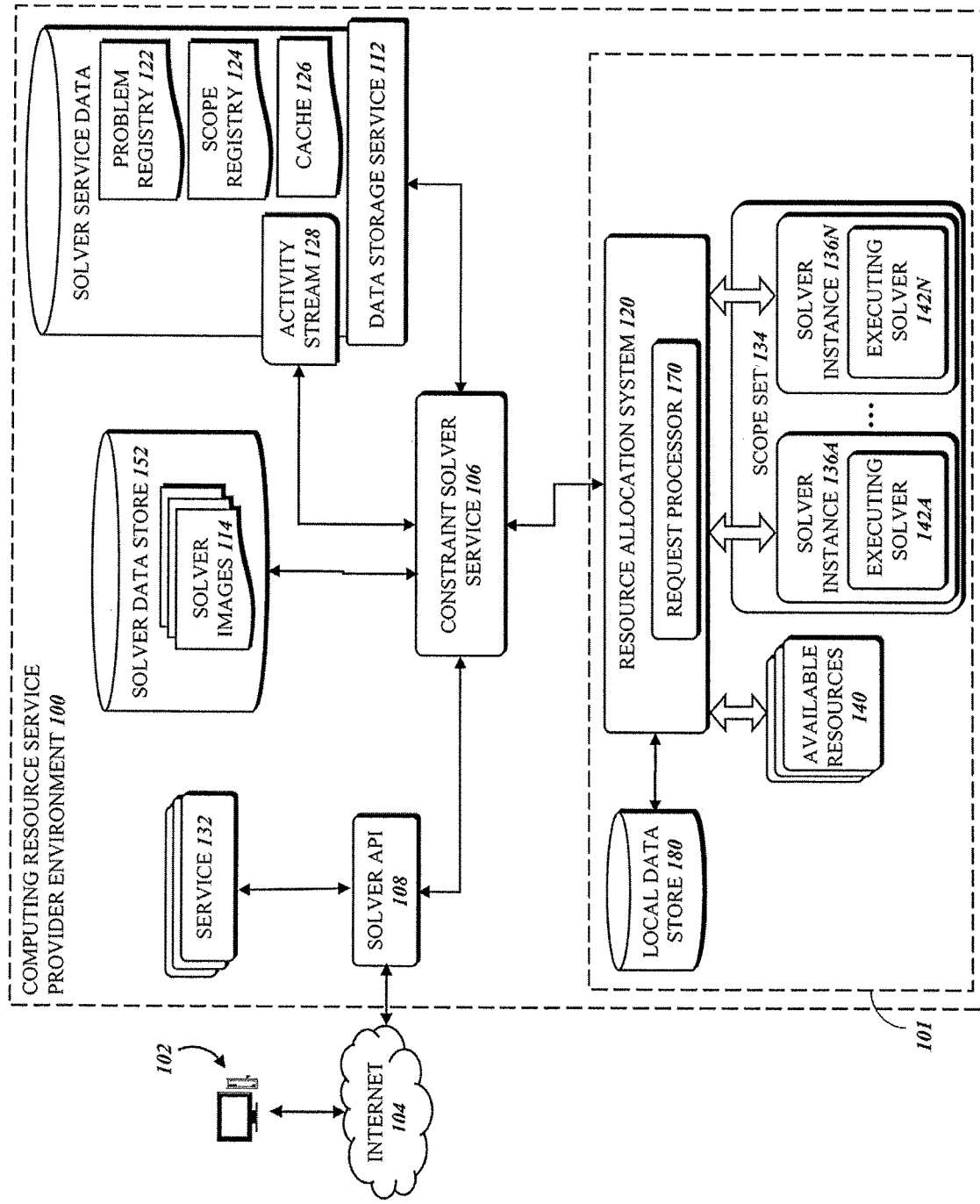
FIG. 1 illustrates a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. Thus, the client may operate and control instances of virtual computing resources, including without limitation: virtual machine instances each emulating a complete computing device having an operating system, processing capabilities, storage capacity, and network connections; virtual machine instances emulating components of a computing device that are needed to perform specific processes; software container instances for executing specific program code, such as a particular software application or a module (e.g., a function) of the application; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated from the environments of other clients.

Virtual computing resources are deployed into a client's virtual computing environment by creating the instance within corresponding resources allocated to the environment, and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks).

The computing resource service provider may allow the client to configure its virtual computing resources so they can receive connections from the computing devices of end users; the client's virtual computing resources can provide software applications, web services, and other computing services to the end users. Additionally or alternatively, the computing resource service provider may allow the client, or an administrative user associated with the computing resource service provider, or another service of the computing resource service provider, to request and deploy virtual computing resources (into an associated virtual computing environment) that are configured to perform "internal" computing functions such as analyzing usage data, debugging programs, validating security policies and settings, and the like. Computing environments implemented as described above can be adapted as described below to provide a constraint solver service that hosts executions of one or more constraint solvers, as well as a corresponding infrastructure and an interface to the constraint solver service that enables an authorized user to submit a query to the constraint solver service and receive an optimized result answering the query, without having to install, support, update, or otherwise maintain any of the constraint solvers that processed the query.

The present disclosure provides systems and methods for deploying a plurality of constraint solvers into a virtual computing environment of a computing resource service provider, and then using the deployed solvers to accurately and efficiently evaluate logic problems. In some embodiments, the system may deploy each of the constraint solvers simultaneously or otherwise substantially concurrently, in order to solve a given logic problem. The system may optimize and/or validate solutions to the logic problem by executing different solvers and/or different configurations of a solver to solve the logic problem. In some embodiments, the system may deploy one or more of a plurality of different solver types, non-limiting examples including Boolean satisfiability problem (SAT) solvers, satisfiability modulo theories (SMT) solvers, and answer set programming (ASP) solvers. The system may further deploy one or more of a plurality of different solvers of the same solver type; for example, the system may support multiple SMT solvers, including without limitation Z3 Prover and CVC4. Finally, where a given supported constraint solver has configurable settings, the system may deploy multiple instances of the solver, each with a different configuration.

The system may include or provide an application programming interface (API) accessible by all or a subset of the computing resource service provider's users. In some embodiments, the API is accessible by other services, systems, and/or resources of the computing resource service provider, and/or by administrative users of such services (e.g., employees of the computing resource service provider). The system thus provides a reusable infrastructure for any "internal" services to obtain solutions to logic problems. For example, a security policy analyzer service may, via the API, use the system to evaluate relative levels of permissibility between two security policies designed to govern access to computing resources. In addition, or alternatively, the API may be accessible by "client" or "external" users of the computing resource service provider, such as individuals and entities that use the provider's services and resources to create their own computing solutions.

In some embodiments, the API may enable a user or service to provide to the system the logic problem to be solved, in a format understood by one or more of the supported solvers. For example, the system may support one or more SMT solvers that use the SMT-LIB problem format; the API may receive the logic problem as a set of SMT-LIB statements. In other embodiments, the API may receive, from the user/service, information and data from which the logic problem is to be derived; the system may then be configured to receive the input data and transform it into the logic problem, formatted for processing by at least one of the supported constraint solvers. The API may provide the user/service with additional controls over the execution of the logic. In some embodiments, the API may enable user selection of the solver(s) to use to execute the logic problem.

For configurable solvers, the API may enable the user to selectively enable and disable solver features, and/or modify the respective values of configurable parameters. Additionally or alternatively, the API may enable user selection of certain characteristics of the system's solution strategy. For example, the user may be able to select whether to prioritize speed of the solution, or accuracy, or validity, which in turn may determine the selection of solvers and configurations, as well as the solution aggregation strategy as described below. In some embodiments, the user may also be able to select between different types of results that the solvers generate. For example, some solvers can return a Boolean yes/no result (i.e., indicating whether or not the logic problem is satisfiable over the enabled theories) and can further return a data structure representing a logical model, or "proof," showing why the Boolean result was "yes" or "no;" user input into the API may direct the system to operate the solvers to produce the desired type of result.

The API may be RESTful (i.e., based on representational state transfer (REST) service architecture), and in some embodiments may provide for asynchronous communication with the system and/or with particular solvers that are executing to solve the logic problem. In some embodiments, the API may be used to provide a "batch execution" mode and also an "interactive execution" mode. In the batch execution mode, the user provides the complete logic problem to the API, such as in a file containing a complete set of statements. In the interactive execution mode, the API may enable the user to build the logic problem incrementally at run-time, by providing individual statements (e.g., SMT-LIB statements) that the system passes to the solver(s) for evaluation; the system may then use the API to send status updates back to the user after each statement is processed.

The system may allocate, configure, and deploy virtual computing resources for executing an instance of a constraint solver. The virtual computing resources to be deployed may include some or all of: one or more virtual machines; one or more software containers; one or more databases or other structured data storage; virtual network interfaces for facilitating communication between the resources; and the like. The resources may be allocated within a user's own virtual computing environment, or within a "backend" computing environment that runs provider services in the background. In some embodiments, the system may use back-end infrastructure and other computing architecture of the computing resource service provider to implement some of the system's own infrastructure; the system may additionally or alternatively include such computing architecture as its own. In some embodiments, the system may use a "serverless" computing architecture, wherein software containers are allocated to the system's processes from any physical computing resources that are available to the virtual computing environment; physical server computers within the computing architecture "pool" their resources, and do not need to be specifically provisioned or separately managed. The system thus manages the solver infrastructure as a service, receiving commands and logic problems from the API and launching solver instances to solve a logic problem at the requisite scale (i.e., amount of dedicated computing resources). The system may also include or implement a caching layer for storing solutions to previously-executed logic problems; the system may check for a cached result to an input logic problem (returning any match) before launching any solver instances.

The system may store a constraint solver's program code, executable files, libraries, and other necessary (or optional) data for executing the solver as a software program within a computing environment that the computing resource service provider can provide. In some embodiments, the system may store a software image of the constrain solver in a data store. The software image may include, as static data, all of the information (i.e., program instructions and other data) needed to launch an instance of the solver. When the system receives a logic problem to execute, the system may determine which solver(s) should be launched and retrieves the associated software image(s). The system may coordinate with a resource allocation service to obtain the virtualized computing resources for the solver instance. For example, the system may cause one or more software container instances to be created, and initializes the container instances using the solver's software image. If the solver instance is to be specially configured, the system may set the desired configuration (e.g., by changing parameter values within configuration files of the newly initialized container instances). The system may then deploy the container instances into the computing environment.

The system may then pass a logic problem to the deployed set of solver instances. A set of solver instances deployed to solve the same logic problem is referred to herein as a "scope." The system ensures that the same logic problem is evaluated by each solver instance in a scope. In some embodiments, this means that each solver instance evaluates the same set of statements; for example, all instances of an SMT-type solver evaluate the same SMT-LIB statements. In other embodiments, the system may transform part or all of the input logic problem to produce one or more alternate encodings comprising different sets of statements each formatted for processing by a particular solver. For example, the system may generate a set of SMT-LIB statements representing the logic problem for processing by SMT solvers, a first set of SAT statements representing the logic problem for processing by conflict-driven clause learning SAT solvers (e.g., Chaff), and a second set of SAT statements representing the logic problem for processing by stochastic local search SAT solvers (e.g., WalkSAT). In another example, the system may generate a plurality of encodings each in the same format, but designed to optimize processing by certain solvers or certain configurations of a solver. In each different set of statements embodied in an encoding, the represented logic problem is the same or substantially the same (i.e., unchanged except where limitations of the solver require a change). In some embodiments, for batch execution the system may cause the execution of the solver instances against the logic problem without supervision or interruption until at least one solver returns a result, an interrupt is submitted by the user, or an execution time limit is reached. Alternatively, the system may monitor the status of the executing solvers, such as by sending heartbeat checks to the scope and processing any missing acknowledgements.

The system may use one or more solution aggregation strategies, selectable by a user's manual input or automatically by the system, to return a solution at a preferred speed and/or with a preferred degree of validity. In one example solution aggregation strategy prioritizing response speed, the system returns the first solution computed by any solver configuration; the system may abort other computations of the same problem and release the associated computing resources. In another example strategy prioritizing correctness of the solution, the system waits for all solver configurations to finish computing a corresponding solution; if any solver returns "error" then the system returns "error," otherwise if all solvers return the same value then the system returns that value, otherwise the system returns "unknown." In another example strategy, the system waits for all solutions from each solver configuration, and returns a data structure (e.g., a JSON object) that includes all solutions and associates each solver configuration to its solution.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1, embodiments of the present disclosure may operate within or upon computing systems of a computing resource service provider environment 100 accessible by users of user computing devices 102 via a computer network 104 such as the internet. FIG. 1 illustrates the conceptual operation of the present systems and methods in interaction, via computing device 102, with a "user" of the computing resource service provider; in various embodiments, the user may be associated with a user account registered by the computing resource service provider, and/or the user may be unregistered (e.g., a guest or a visitor using one or more services that do not require authorization) but nonetheless authorized to use the present systems and methods. FIG. 1 also illustrates the conceptual operation of the present systems and methods in interaction with one or more other services 132 operating within the computing resource service provider environment 100. A user (of user computing device 102) or a service 132 may be a "client" connecting to the present systems and using the present methods, as provided by the computing resource service provider. The environment 100 illustrates an example in which a client may request a constraint solver service 106 to coordinate a certain number N of constraint solvers 142A,B, . . . , N to solve a logic problem, where each of the N constraint solvers 142A-N has a different type or a different configuration or solves a different encoding of the logic problem than the other solvers 142A-N. Generally as used herein, "solving" a logic problem includes receiving one or more sets of problem statements that comprise the logic problem, receiving a command to evaluate the logic problem, evaluating the logic problem according to a solver configuration, and producing and returning one or more results, optionally with additional information. The constraint solver service 106 in turn may deliver one or more of the results to the client and/or to other data storage, as described by example below.

The constraint solver service 106 may itself be a service of the computing resource service provider. The constraint solver service 106 may be implemented in the environment 100 using hardware, software, and a combination thereof. In some cases, the constraint solver service 106 supports, implements, or communicates with one or more APIs that a client may use to provide requests to the constraint solver service 106. The constraint solver service 106 may support one or more APIs that are used to obtain logic problem evaluations, such as an API to submit a logic problem or a part of a logic problem (e.g., one or more problem statements) to the constraint solver service 106, and an API to issue commands to one or more of the executing solvers 142A-N. APIs described herein for enabling a client (i.e., a user via computing device 102 or another computing device, a service 132 of the computing resource service provider, or a service (not shown) external to the environment 100) to use the constraint solver service 106 are illustrated in FIG. 1 collectively as a solver API 108, described further below.

The constraint solver service 106 may be used to configure and deploy constraint solvers 142A-N (e.g., into a virtual computing environment 101), push a logic problem (and changes thereto) to the deployed solvers 142A-N, control the execution of the solvers 142A-N during computation of solutions, process, store, and deliver results, and manage computing resources associated with the problem scope. Some of these tasks may be driven by client input, and others may occur automatically in accordance with service configuration parameters. For example, an API call supported by the constraint solver service 106 may accept a logic problem in a known solver format (e.g., SMT-LIB) and deploy a default set of instances of the appropriate solver, each with a different configuration. As a second example, an API call may accept a logic problem in a known solver format or another input format, and may automatically generate one or more encodings of the logic problem in different formats recognized by different deployed solvers. As a third example, an API call may accept a request including a logic problem and one or more solver configurations, and may deploy a set of solvers each having a different one of the client-provided configurations. The constraint solver service 106 may include multiple components and/or modules that perform particular tasks or facilitate particular communications. For example, the constraint solver service 106 may include communication modules for exchanging data (directly or via an API, a messaging/notification service, or another suitable service) with a data storage service 112, a resource allocation system 120, or another service/system of the computing resource service provider.

As described in more detail above, a constraint solver is a software or combination software/hardware application that automatically solves complex logic problems provided to the solver in a recognizable format. Embodiments of the present systems and methods may deploy a constraint solver as an executable program that, when executing, takes a logic problem as input and can receive one or more commands, including a "solve" command that causes the solver to evaluate the input logic problem. A constraint solver may execute within allocated physical and/or virtualized computing resources, using various processors, runtime memory, data storage, etc., and sometimes in accordance with a customizable configuration, to receive and respond to commands, evaluate the logic problem to produce solutions/results, and make the solutions/results available to the solver's operator. FIG. 1 illustrates an example computing architecture in which the constraint solver service 106 may control the allocation of virtual computing resources of the environment 100 as N solver instances 136A,B, . . . , N each configured to support one of the executing solvers 142A-N operated by the constraint solver service 106 according to input from a client (i.e., via the solver API 108, which may be a website, web application, command console, and the like, as described further below). A solver instance 136A-N may, for example, be a virtual machine instance, a container instance or set of container instances, or another type of virtual computing resource that can host an executable copy of a constraint solver, and that includes or accesses processors and memory as needed for the constraint solver to execute (i.e., to receive and process commands and compute solutions to logic problems).

In some embodiments, the computing resource service provider implements, within its computing environment 100, at least one virtual computing environment 101 in which users may obtain virtual computing resources that enable the users to run programs, store, retrieve, and process data, access services of the computing resource service provider environment 100, and the like. The virtual computing environment 101 may be one of any suitable type and/or configuration of a compute resource virtualization platform implemented on one or more physical computing devices. Non-limiting examples of virtual computing environments 101 include data centers, clusters of data centers organized into zones or regions, a public or private cloud environment, and the like. The virtual computing environment 101 may be associated with and controlled and managed by the client (e.g., via a user interface that may include the solver API 108). In some embodiments, the virtual computing environment 101 of a particular client may be dedicated to the client, and access thereto by any other user of the computing resource service provider environment 100 prohibited except in accordance with access permissions granted by the client, as described in detail herein.

The computing resource service provider environment 100 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider environment 100, and/or with the computing environments. It will be understood that services depicted in the Figures as inside a particular virtual computing environment 101 or outside all virtual computing environments may be suitably modified to operate in the data processing architecture in a different fashion that what is depicted.

In general, a user computing device 102 can be any computing device such as a desktop, laptop, mobile phone (or smartphone), tablet, kiosk, wireless device, and other electronic devices. In addition, the user computing device 102 may include web services running on the same or different data centers, where, for example, different web services may programmatically communicate with each other to perform one or more techniques described herein. Further, the user computing device 102 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider environment 100 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a computing device 102 may access the computing resource service provider environment 100 via a user interface, which may be any suitable user interface that is compatible with the computing device 102 and the network 104, such as an API, a web application, web service, or other interface accessible by the user device 102 using a web browser or another software application, a command line interface, and the like. In some embodiments, the user interface may include the solver API 108, or the computing resource service provider may provide several user interfaces, including the solver API 108. A user interface such as the solver API 108 may include code and/or instructions for generating a graphic console on the user device 102 using, for example, markup languages and other common web technologies. The solver API 108 may, via the connecting device 102, present a user with various options for configuring, requesting, launching, and otherwise operating constraint solvers in the virtual computing resources of one or more of the computing environments 101. User input (e.g., text, computer files, selected elements from a list or menu, mouse clicks on buttons, and other interactions) entered into the solver API 108 by the user may be received and processed by one or more components of the computing resource service provider environment 100, particularly the constraint solver service 106 as described herein. For example, the solver API 108 may translate the user input into instructions executable by the constraint solver service 106 to operate N constraint solvers to solve a logic problem and return a result according to a solution aggregation strategy. In some embodiments, the solver API 108 may accept connections from one or more services 132, enabling a service 132 to submit input including logic problems and commands and translating the input into instructions for the constraint solver service 106.

A computing environment 101 may be configured to provide compute resources to clients that are authorized to use all or part of the computing environment 101. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 101 may be configured to allocate compute resources of corresponding hardware computing devices by virtualizing those resources to produce a fixed or variable quantity of available virtual computing resources 140. The available resources 140 may be provided in a limited manner to one or more users that submit requests for virtual computing resources within the computing environment 101; such resources that are allocated to and/or in use by a particular user (represented in FIG. 1 by the solver instances 136A-N) are deducted from the available resources 140. Various functions related to processing requests to use virtual resources, to otherwise managing the allocation and configuration of the available resources 140 and allocated virtual resources, and to limiting the amount of virtual resources that are allocated to a particular user in accordance with the present systems, may be performed by one or more services executing within the computing environment 101 and/or outside of it (i.e., in the data processing architecture of the computing resource service provider environment 100).

In some embodiments, a resource allocation system 120 operating within the computing environment 101 may cooperate with the constraint solver service 106 implemented outside of the computing environment 101 to manage the allocation of virtual resources to a particular scope set 134 containing the solver instances 136A-N deployed for a particular logic problem. In some embodiments, the resource allocation system 120 receives at least the communications that contain requests, commands, instructions, and the like (collectively herein, "requests"), to allocate, launch, execute, run, or otherwise provide, for use by an identifiable user (e.g., the client), and to deactivate or deallocate, one or more virtual computing resources in the computing environment 101. The constraint solver service 106 may communicate such resource requests to the resource allocation system 120; a resource request received by the constraint solver service 106 may be generated directly by the client (e.g., using the solver API 108), or the request may be generated as, or in response to, an output (e.g., a trigger event message) of another component of the computing resource service provider environment 100 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled from the available resources 140, and if the request can be fulfilled, provide a virtual computing resource configured for use according to the parameters of the request. The request processor 170 or another component of the resource allocation system 120 may be configured to send to the constraint solver service 106 or to the solver API 108 information related to processing the request, such as error, completion, and other status messages. The resource allocation system 120 may additionally collect and/or generate usage data describing aspects of virtual computing resources allocated as described herein. Non-limiting examples of such usage data may include: configuration and/or status parameters of a virtual computing resource at the time of launch or failure to launch; information related to the processing of a request to use virtual computing resources; monitoring data collected by monitoring virtual computing resource operations, such as network communications, data storage and retrieval and other disk access operations, execution of software programs, and the like; and, state data such as a snapshot of the state of the virtual computing resource at the time it is provisioned, deploys, terminates, fails, or generates an error, or at any other time. The usage data may be stored in a local data store 180 implemented within the computing environment 101. The data stored in the local data store 180 may be accessible only to the client, or may be accessible by certain other systems and/or services. For example, the constraint solver service 106 may, by default or by user authorization, access and use the usage data of one user or multiple users to monitor the state of executing solvers 142A-N.

In some embodiments, the constraint solver service 106 may cause solver instances 136A-N to be configured and deployed by sending, to the resource allocation system 120, resource requests that include all of the information needed to provision and configure virtual computing resources as a solver instance 136A that hosts an executing solver 142A. For example, the constraint solver service 106 may instruct the resource allocation system 120 to launch a solver instance 136A based on a solver image 114. A solver image 114 may be a binary file or set of binary files, a software container image, or another software image containing all of the data and instructions needed to install an executable copy of the corresponding constraint solver program on a solver instance. For example, a solver image 114 for the Z3 SMT solver may include all of the Z3 binary executable files, libraries, and other data files that together comprise a Z3 installation. The solver images 114 for all of the constraint solvers that comprise the portfolio of "available" constraint solvers deployable by the system may be stored in a solver data store 152. The constraint solver service 106 may store, retrieve, modify, or delete solver images 114 in the solver data store 152 automatically and/or in response to user input, triggering events, or commands from other services 132 of the computing resource service provider. For example, the services 132 may include a service that routinely obtains an image of the newest build of the Z3 solver; the constraint solver service 106 may receive the new image from the service 132 and store it as the solver image 114 for Z3 in the solver data store 152, replacing outdated versions of the solver in the process.

The constraint solver service 106 may further submit, as part of the resource requests, configuration parameters and other information that the resource allocation system 120 uses to apply a particular solver configuration to the solver 142A installed in a given solver instance 136A. Additionally, as a result of installing the solver image 114 or in response to parameters of the resource request, the resource allocation system 120 may configure one or more of the solver instances 136A-N with an exposed communication endpoint that the constraint solver service 106 and/or the solver API 108 can use to directly access a solver instance 136A and send commands, problem statements, and other data to the corresponding solver 142A, rather than sending such communications through the resource allocation system 120. For example, the resource allocation system 120 may map one or more remote procedure call (RPC) endpoints to each solver instance 136A-N and provide the corresponding endpoints to the constraint solver service 106.

The constraint solver service 106 may directly manage stored data associated with the service's tasks; in the illustrated example, however, the constraint solver service 106 cooperates with a data storage service 112 of the computing resource service provider in order to store and manage solver service data. The data storage service 112 may be any suitable service that dynamically allocates data storage resources of a suitable type according to the data to be stored, and may encrypt and store data, retrieve and provide data, and modify and delete data as instructed by the constraint solver service 106. The constraint solver service 106 may create suitable data structures for storing records associated with clients' usage of the service, and may cause the data storage service 112 to store, retrieve, modify, or delete the records as provided by various tasks. In some embodiments, the solver service data maintained by the data storage service 112 may include a plurality of tables, or other relational or nonrelational databases, for maintaining registries of logic problems that are presently being evaluated by the constraint solver service 106. One such registry may be a problem registry 122, which may be a table of records each recording one of the logic problems that has been submitted for evaluation; the constraint solver service 106 may, upon receiving a logic problem for evaluation, first check that the logic problem is not already being evaluated, by comparing information associated with the logic problem against the records in the problem registry 122—a match indicates that the constraint solver 106 does not need to deploy new solver resources to evaluate the problem.

Another registry may be a scope registry 124, which may be a table of records stored in persistent memory; each scope record may include the physical identifiers of the solver instances 136A-N belonging to the scope (i.e., the scope set 134), as well as access information (e.g., the RPC endpoints for the solver instances 136A-N), an identifier for the logic problem (e.g., a reference to the corresponding problem registry 122 record) associated with the scope, and other information pertinent to operating the scope, such as active/inactive flags, child scope references, and time-to-live information. In other embodiments, some of the information associated with a scope or a logic problem may be stored in additional/secondary registries or other data stores managed by the data storage service 112.

In some embodiments, the system may implement a cache layer for quickly retrieving past-computed solutions to previously evaluated logic problems. For example, the constraint solver service 106 may cooperate with the data storage service 112 to maintain a cache 126, which may be a relational or nonrelational database, such as a dynamic table of records each comprising a data structure that contains the data elements of a cached solution. In one embodiment, a cache record may include an identifier or other descriptive information for the logic problem from which the solution was produced; the constraint solver service 106 may, upon receipt of a logic problem, compare corresponding information for the logic problem to the cache records to obtain a cached solution to the input problem, rather than re-computing the solution. Cache records may further include a time-to-live, after which the data storage service 112 or the constraint solver service 106 deletes the cache record. In some embodiments, a cache record may contain a solution computed by a scope that is still active (i.e., the solvers 142A-N in the corresponding scope set 134 can receive further commands); when the constraint solver service 106 launches a new command on the scope set 134, the corresponding cache record may be invalidated or deleted.

The data storage service 112 may additionally maintain an activity stream 128 comprising a log of actions performed on some or all of the solver service data. In some embodiments, this activity stream 128 may be available to the constraint solver service 106 for monitoring scopes and maintaining the corresponding resources. For example, the constraint solver service 106 may use the activity stream 128 to terminate scopes, releasing the corresponding allocated resources, after a predetermined period of inactivity. In one embodiment of this function, the data storage service 112 may be configured to delete a scope record in the scope registry 124 when the associated time-to-live is reached, and the constraint solver service 106 refreshes the time-to-live for the scope when handling a request to the corresponding resources; when the data storage service 112 deletes the scope, an entry logging the event is added to the activity stream 128; the entry triggers the constraint solver service 106 to delete any local data associated with the scope and to cause the resource allocation system 120 to terminate the solvers 142A-N, delete any data (e.g., in the local data store 180 or in logical storage volumes of the solver instances 136A-N) associated with the corresponding scope. If the corresponding scope was the parent scope for the scope set 134, the resource allocation system 120 may be directed to either deallocate the corresponding virtual computing resources or store the solver instances 136A-N for allocation to a future logic problem request.

Figure 2A:
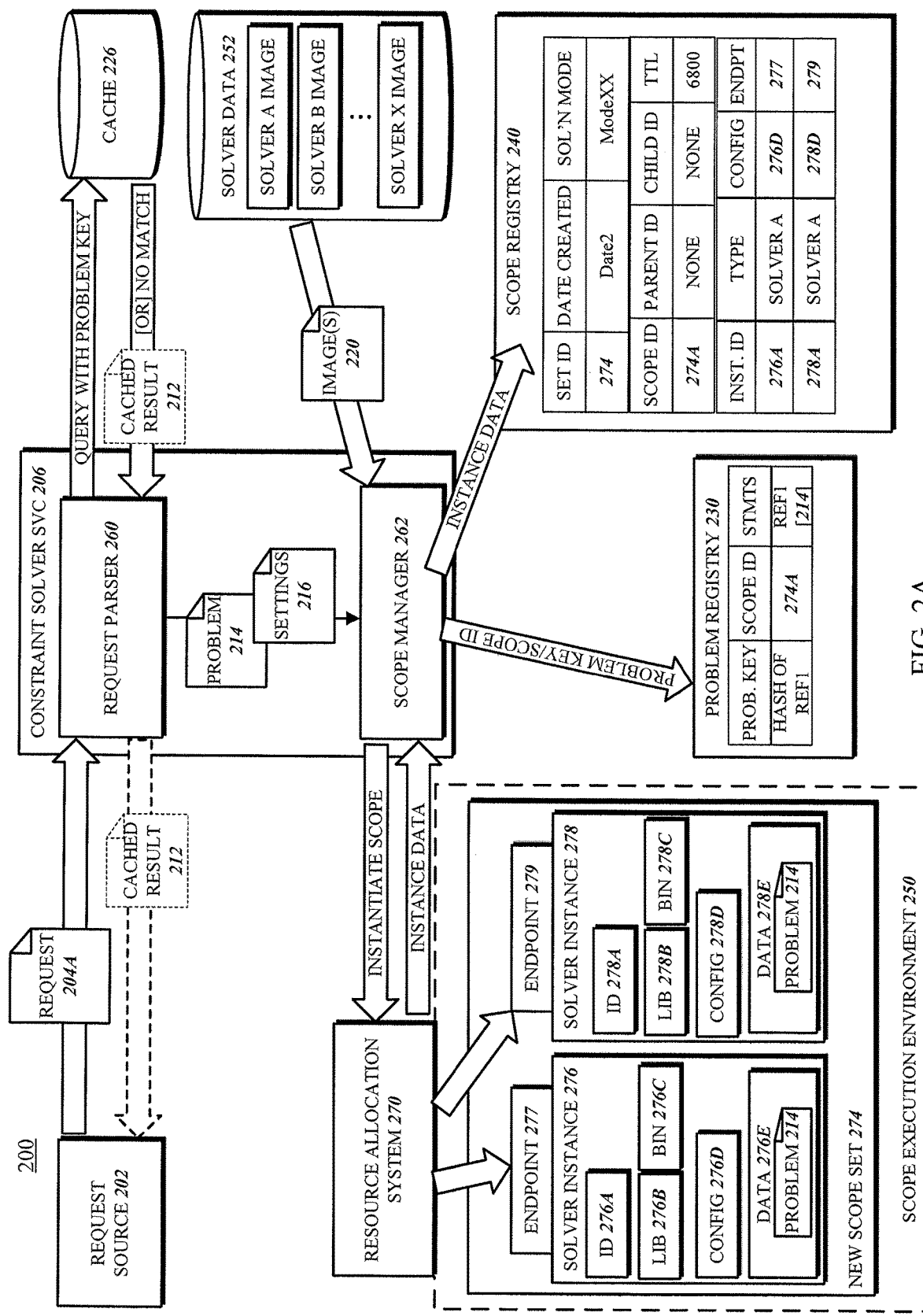
FIGS. 2A-D are diagrams illustrating an example data flow between components of the system, in accordance with this disclosure.

FIGS. 2A-2D illustrate an example flow of data between system components in a computing environment 200 such as the computing resource service provider environment 100 of FIG. 1. Referring to FIG. 2A, a request source 202, such as a user computing device or a compute service, submits a request 204A to a constraint solver service 206, as described above, to deploy a plurality of constraint solvers and coordinate the solvers to compute one or more solutions to a logic problem partially or completely defined, or otherwise identified, in the request 204A. The constraint solver service 206 may include, among other processing modules, a request parser 260 and a scope manager 262. The request parser 260 may be configured to read the request 204A and obtain therefrom the logic problem 214 (or the portion submitted) and in some embodiments also one or more settings 216, such as values for parameters that configure various aspects of the computation process. An example of a body of the request 204A to solve an SMT problem is as follows:

```
"request_body"{
    "problem" : "data:text/plain;charset=UTF-8;....",
    "aggregation_strategy" : "firstWin",
    "solvers" :
        {
        "z3Fast" : {
            "solver" : "z3",
            "flags" : { "auto_config" : "true" , "..."}
            },
        "z3Deep" : {
            "solver" : "z3",
            "flags" : { "..."}
            },
        "cvc4_Simple" : {
            "solver" : "cvc4",
            "flags" : { "..."}
            },
        }
}
```

The "problem" field contains the plain text problem statements of the logic problem, in SMT-LIB format. The "aggregation_strategy" field identifies the solution aggregation strategy to be used by the constraint solver service 206 once it starts receiving results from executing solvers that are evaluating the logic problem. A "solution aggregation strategy" may be understood as a series of steps for transforming the results of the solvers' evaluation into a solution for the logic problem; generally, the steps of a given strategy determine which of the solvers' results are included or considered in the solution, which results may be gathered and stored as complementary data to the solution, and which results may be discarded or, in some cases, preempted by aborting the corresponding solver's calculations before they are complete. Various example solution aggregation strategies are described herein.

The "solvers" data set identifies the solvers and solver configurations to use to solve the logic problem. Here, three solvers are identified and so N=3 solver instances will be deployed: a first solver instance will be associated with "z3Fast" and will have the Z3 solver installed and configured using the values in the "flags" field, which are selected to cause the solver to execute a low-intensity evaluation and produce a result quickly; a second solver instance will be associated with "z3Deep" and will have the Z3 solver installed and configured using the values in the "flags" field, which are selected to cause the solver to execute a thorough but typically slower (compared to z3Fast) evaluation; and, a third solver instance will be associated with "cvc4_Simple" and will have the CVC4 solver installed and configured using the values in the "flags" field, which are selected to cause the solver to execute a low-intensity evaluation and produce a result quickly.

For purposes of illustration in FIGS. 2A-D, the logic problem 214 comprises a plain-text or encoded file containing an ordered list of problem statements formatted as input to one or more of the solvers in the system's portfolio of available solvers, represented by the images for solvers A-X stored in the solver data store 252. A problem statement may include a command, a formula, an assertion, an expression, and any other statement having the appropriately formatted syntax. For example, a problem statement in an SMT-LIB format may be a propositional logic formula. As used herein, propositional logic may refer to a symbolic logic that relates to the evaluation of propositions that may evaluate to either being true or false. Propositional logic may be utilized to evaluate the logical equivalence of propositional formulas. A propositional formula. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic.

The request parser 260 may validate the logic problem 214, such as by confirming that the problem statements are all formatted with the appropriate syntax. In some embodiments, the request parser 260 or another module may verify that none of the problem statements contain an invalid or disallowed command. For example, the logic problem 214 extracted from the body of the request may not include a "solve" command; if it does, the request parser 260 may return an error code (e.g., HTTP code 400 "Bad Request") to the API/user and terminate processing. In some embodiments, the request parser 260 or another module of the constraint solver service 206 may determine whether the cache 226 contains a cached result 212 previously computed for the logic problem 214. For example, the request parser 260 may obtain a hash of the character string formed by the problem statements in the logic problem 214 (e.g., by applying a hash function to the character string, of variable size, to map the character string to a "hash," or a string of fixed size), and may compare the hash to identifiers in the cache 226 records, which identifiers were produced by hashing the logic problem associated with the recorded solution using the same hash function. If there is a match, the request parser 260 may obtain the associated cached result 212 and send it to the request source 202.

If there is no match in the cache 226, the request parser 260 may pass the logic problem 214 and any settings 216 contained in the request 204A to the scope manager 262. The scope manager 262 may perform or coordinate some or all of the tasks for deploying a new scope set 274 containing solver instances 276, 278 that will compute solutions to the logic problem 214. The scope manager 262 may create a record for the logic problem 214 and add the record to the problem registry 230. For example, the scope manager 262 may: generate an identifier 274A for the new scope set 274; generate a hash of the logic problem 214 as described above; create a problem identifier that includes the hash; and, store the problem identifier and scope identifier 274A and optionally the logic problem 214 or a reference thereto in a new record in the problem registry 230. The scope manager 262 may determine, based at least in part on the logic problem 214 and any settings 216, the number N of solver instances needed, and which solvers will be installed on them. For example, the settings 216 may include N solver definitions, as in the example above; or, there may be no settings 216 for the solvers, and the scope manager 262 may use a default set of solver configurations. The scope manager 262 may obtain the associated solver image(s) 220 from the solver data store 252.

The scope manager 262 may then communicate with the resource allocation system 270 to instantiate the scope within the scope execution environment 250 (e.g., a virtual computing environment as described above). For example, the scope manager 262 may send one or more resource requests to the resource allocation system 270, which cause the resource allocation system 270 to allocate the necessary virtual computing resources to implement the N (in the illustrated example, N=2) solver instances 276, 278. The scope manager 262 may send the solver image(s) 220 to the resource allocation system 270, or otherwise cause the resource allocation system 270 to obtain the image(s) 220 and then use the images 220 to install the corresponding solvers in the solver instances 276, 278. The scope manager 262 may additionally send the settings 216 and the logic problem 214 to the resource allocation system 270 and cause the solver instances 276, 278 to be initialized upon launch with the logic problem 214 stored locally and the configurations specified in the settings 216 applied. Alternatively, the scope manager 262 may cause the solver instances 276, 278 to be launched into the environment 250 with the corresponding solver(s) installed, and may subsequently configure each solver instance 276, 278 and send the logic problem 214 to each solver instance 276, 278 for storage (e.g., via remote procedure calls to the corresponding endpoints 277, 279).

As illustrated, the deployed new scope set 274 includes N solver instances 276, 278, each having corresponding data including: a physical identifier 276A, 278A assigned to the instance 276, 278 by the resource allocation system 270 in order to manage the corresponding virtual computing resources; required data for the installed solver, such as object libraries 276B, 278B and executable binary files 276C, 278C; a local configuration 276D, 278D for the corresponding solver (i.e., a set of parameter/value pairs representing processing conditions, enabled/disabled features, etc.); and, an attached logical storage volume 276E, 278E containing the logic problem 214. The scope manager 262 receives the data associated with the new scope set 274 instantiation and stores it with other pertinent scope data in a new entry in the scope registry 240. An example entry is illustrated and explained further below.

The example of FIG. 2A illustrates the submission of a single request 204A that initiates the constraint solver service's 206 processing of a logic problem 214; in this embodiment, the entire logic problem 214 (or at least the complete set of problem statements comprising the parent scope, as described below) is contained in or accompanies the request 204A. Alternatively, the first request 204A may include only one or some of the problem statements, and before, during, or after instantiation of the new scope set 274, additional requests or API calls may be submitted by the request source 202 and may include additional problem statements. The constraint solver service 206 may aggregate the problem statements (e.g., in the order in which they are received) in order to gradually build the logic problem 214. In still another embodiment, the constraint solver service 206 may further push the problem statements, as they are received, to the deployed solver instances 276, 278.

Figure 2B:
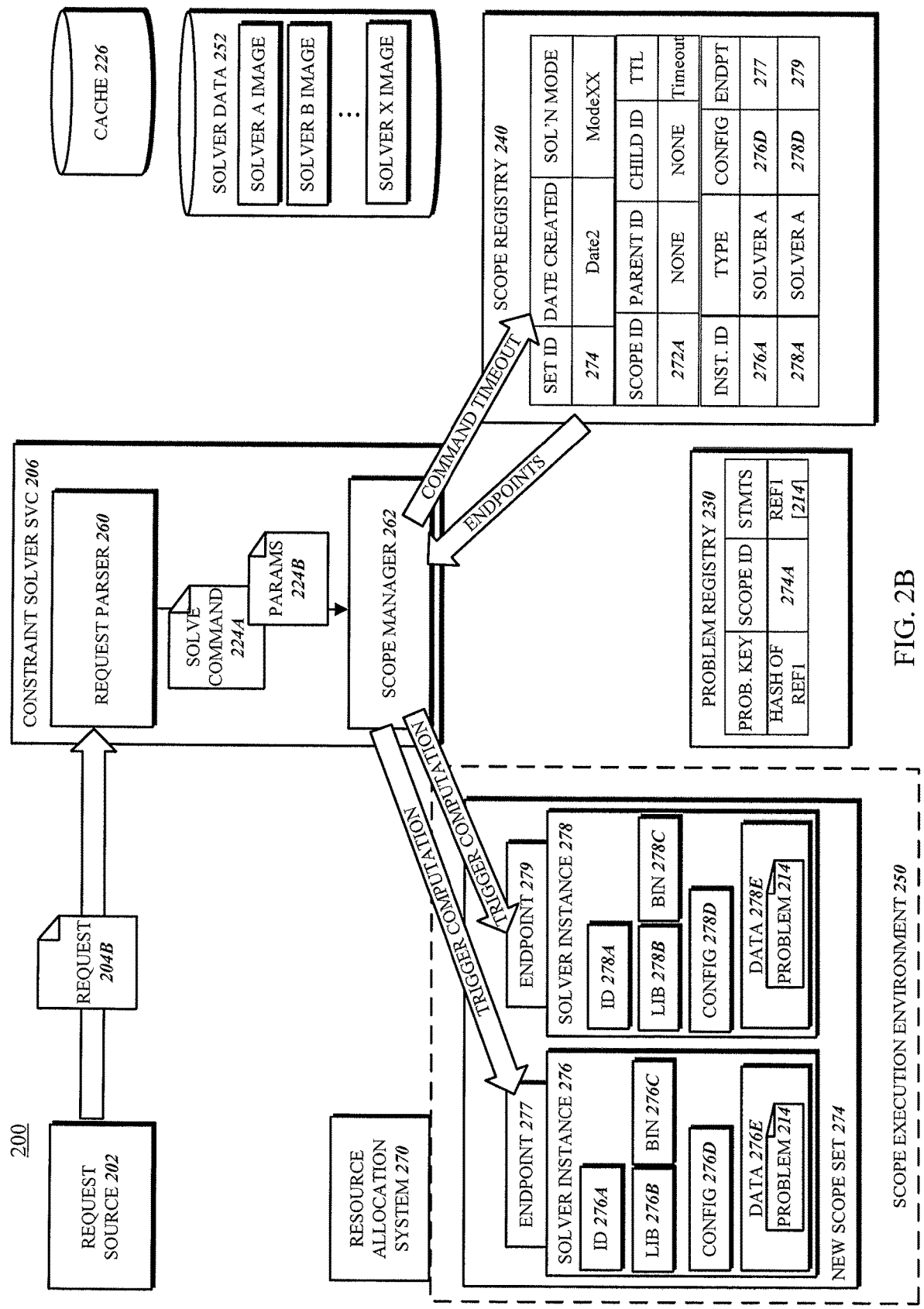

Referring to FIG. 2B, after the logic problem 214 is pushed to the solver instances 276, 278, the constraint solver service 206 may receive another request 204B from the request source 202. The request parser 260 may determine that the request 204B includes a "solve" command intended to execute each deployed solver's computation of one or more solutions to the problem 214. The request parser 260 may send the solve command 224A, or a signal representing the solve command, to the scope manager 262. The request parser 260 may further extract one or more parameters 224B included in the request 204B and configuring how the solve command 224A is processed. For example, the parameters 224B may include one or more "native" parameters understood by the deployed solvers (i.e., as arguments in a command-line execution of the solver's solve command). In another example, one or more of the parameters 224B may configure the scope manager 262 to process the solve command 224A. In one embodiment, the parameters 224B may identify the solution aggregation strategy to be applied to the new scope set 274; the scope manager 262 may manage the computation processes of the deployed solvers using the identified solution aggregation strategy. Additionally, the parameters 224B may include a timeout period having a value that sets the amount of time the solvers will be allowed to execute.

The scope manager 224B may store various parameters 224B, such as the solution mode (i.e., solution aggregation strategy) and the timeout period, in the scope record. Then, the scope manager 262 may interpret the solve command 224A to determine the appropriate solver command(s) to send to the deployed solvers to trigger the computation of solutions. The scope manager 262 may obtain the endpoints 277, 279 needed to communicate with the solver instances 276, 278, and may send the corresponding solver commands to the solvers to trigger the computations.

Figures 1, 2C:
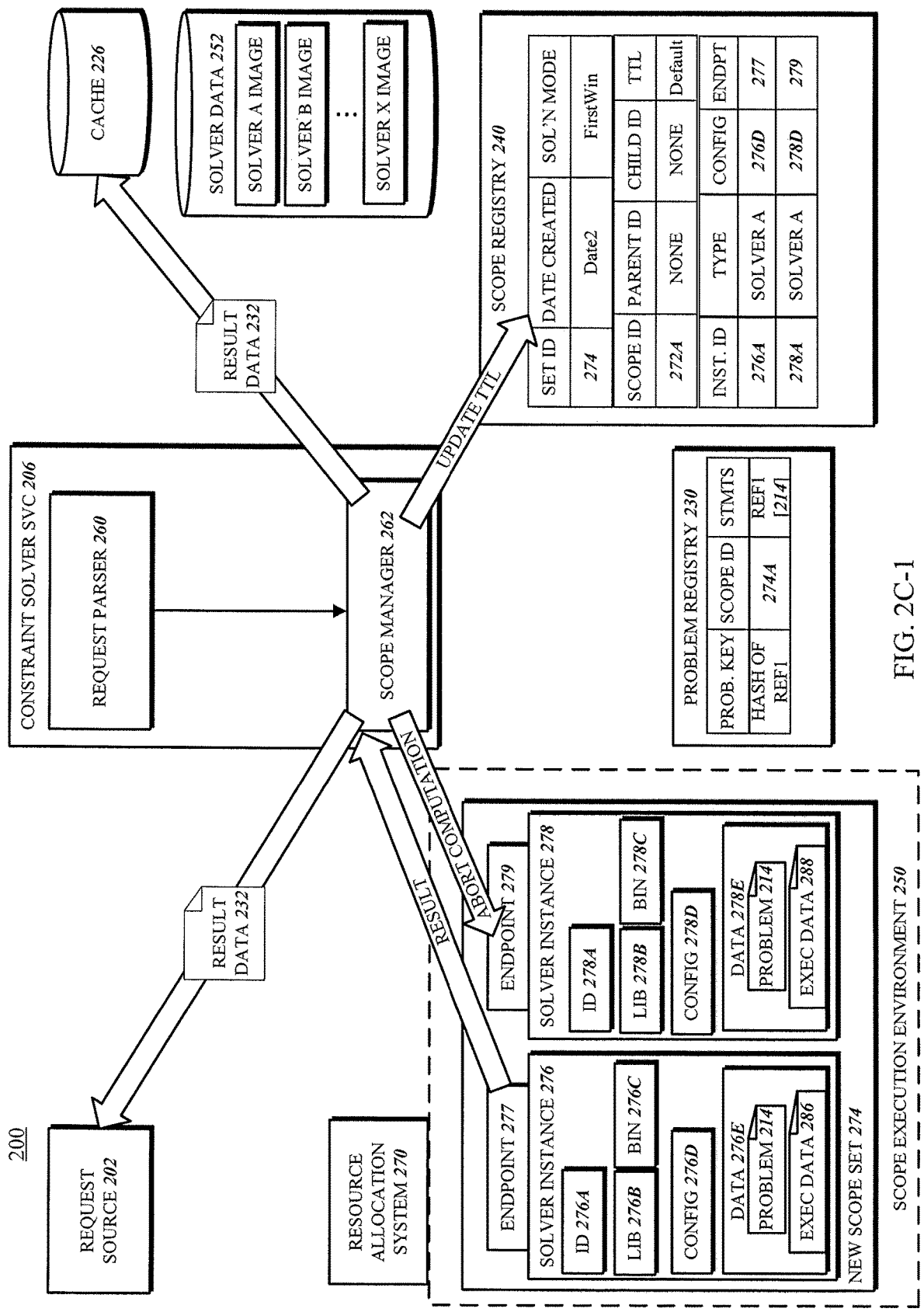
Figures 2, 2C:
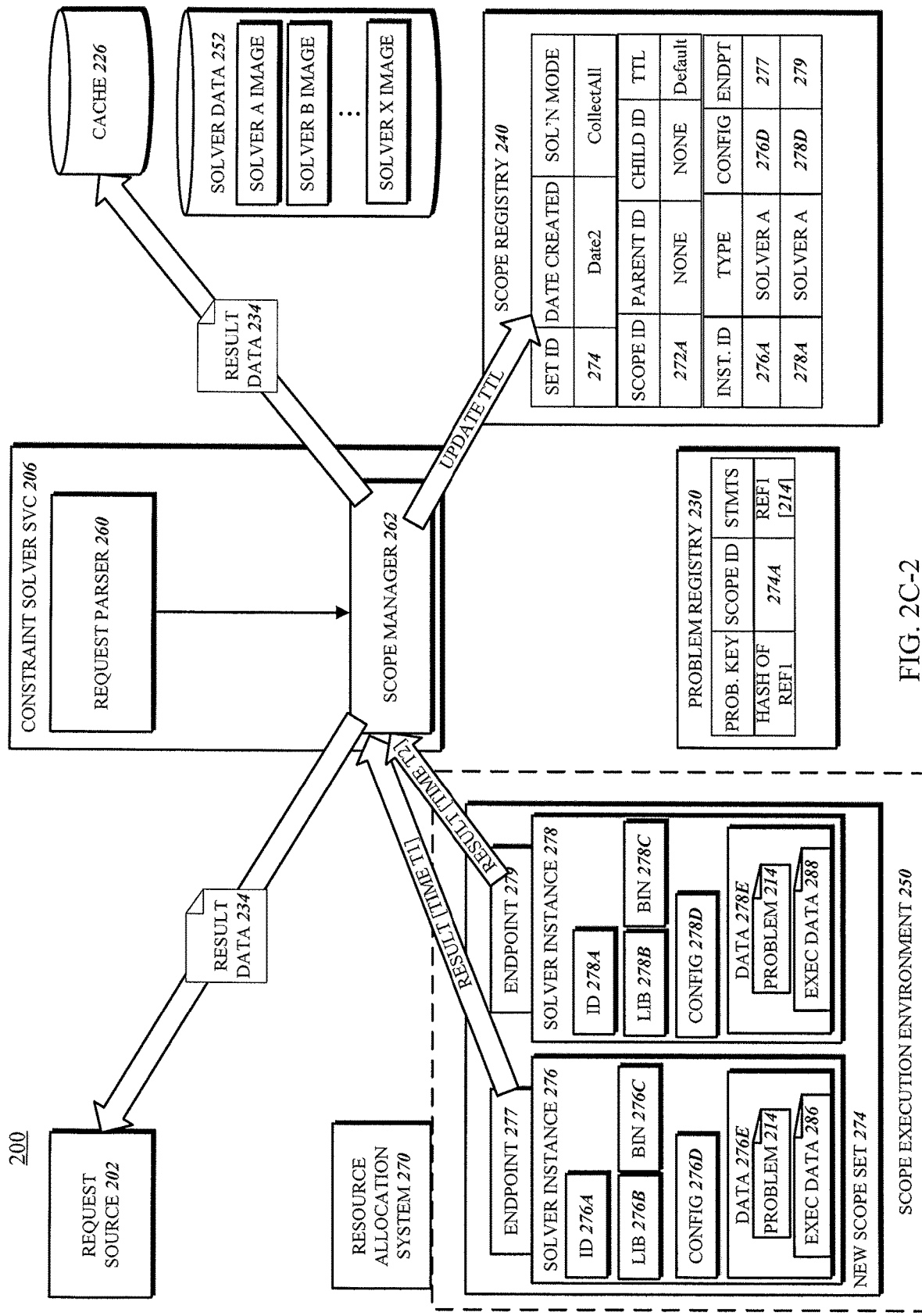

FIGS. 2C-1 and 2C-2 illustrate processing of solver results according to two different possible solution aggregation strategies. In FIG. 2C-1, the scope manager 262 employs a "FirstWin" strategy that prioritizes speed of computation. Specifically, the scope manager 262 receives the computed result from a first solver executing on a first solver instance 276; determining that the first solver's result is the first one (in time) received, the scope manager 262 may then communicate with the other solver(s), their corresponding solver instance(s) 278, or the resource allocation system 270, to cause the other solver(s) to abort the computations that are underway. The scope manager 262 may also package the first-received result as result data 232 comprising the result information in a data structure that can be delivered to the request source 202. The scope manager 262 may send the result data 232 to the request source 202, and may also send the result data 232 or another data structure comprising the result to the cache 226. For example, the scope manager 262 may include the problem key (comprising at least the hash of the logic problem 214) in the result data 232 sent to the cache 226. In FIG. 2C-2, the scope manager 262 employs a "CollectAll" strategy in which the results of all executing solvers are collected and aggregated into a data structure as the result data 234. Once the results of all solvers have been added to the result data 234, the scope manager 262 may send the result data 234 to the request source 202 and the cache 226.

Figure 2D:
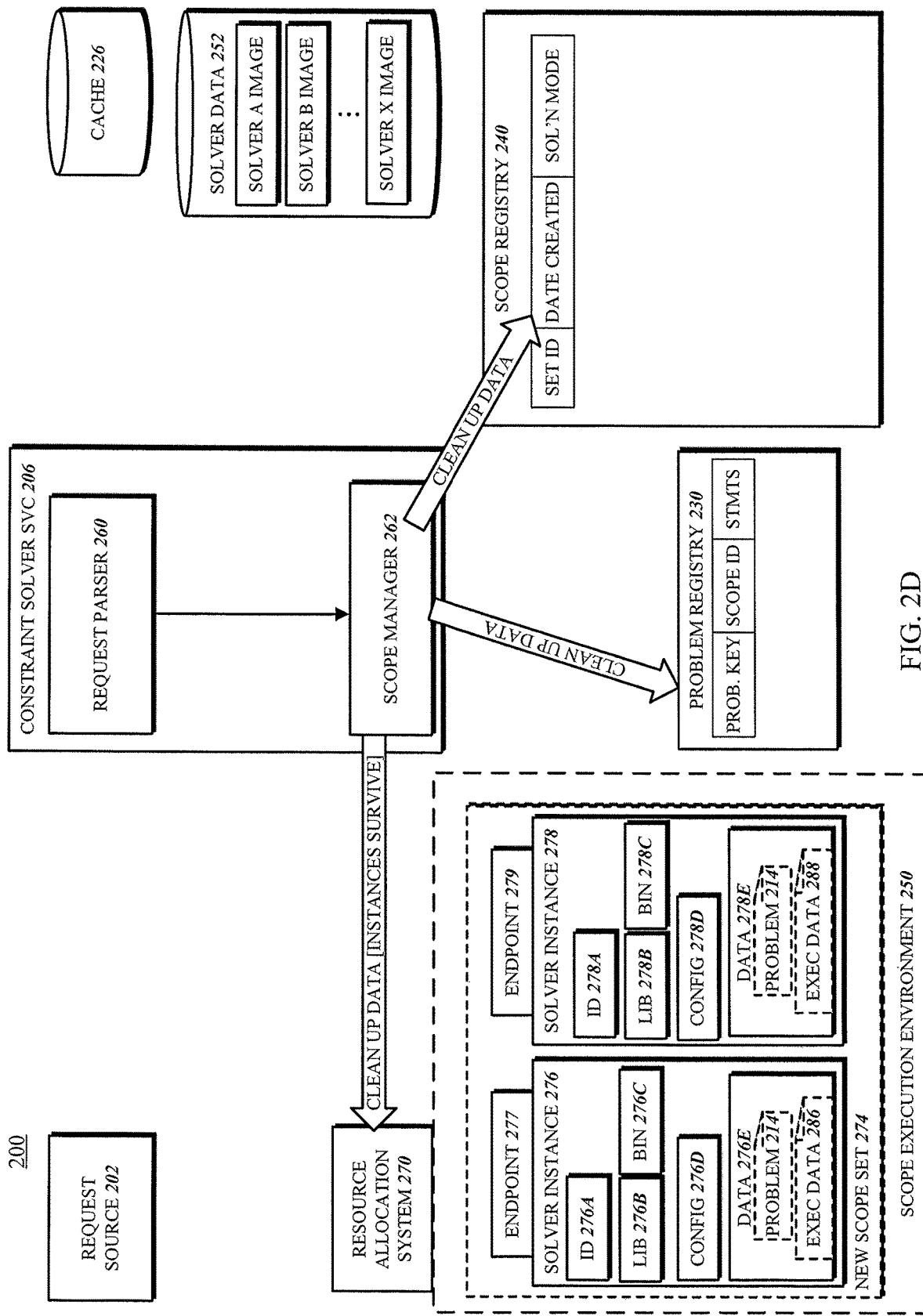

Referring to FIG. 2D, in accordance with the solution aggregation strategy, after the computations have been completed/terminated, the scope manager 262 may coordinate the cleanup of data associated with solving the logic problem 214 and the release of computing resources for either reuse by the constraint solver service 206 (as illustrated) or de-allocation/de-provisioning by the resource allocation system 270. The scope manager 262 may perform various cleanup tasks, including without limitation: communicating with the solver instances 276, 278 and/or the resource allocation system to delete the logic problem 214 data and any execution data 286, 288 generated by the corresponding solver during computation of the solution(s); removal of entries associated with the logic problem 214 from the problem registry 230; and, removal of entries associated with the new scope set 274 from the scope registry 240.

Figure 3A:
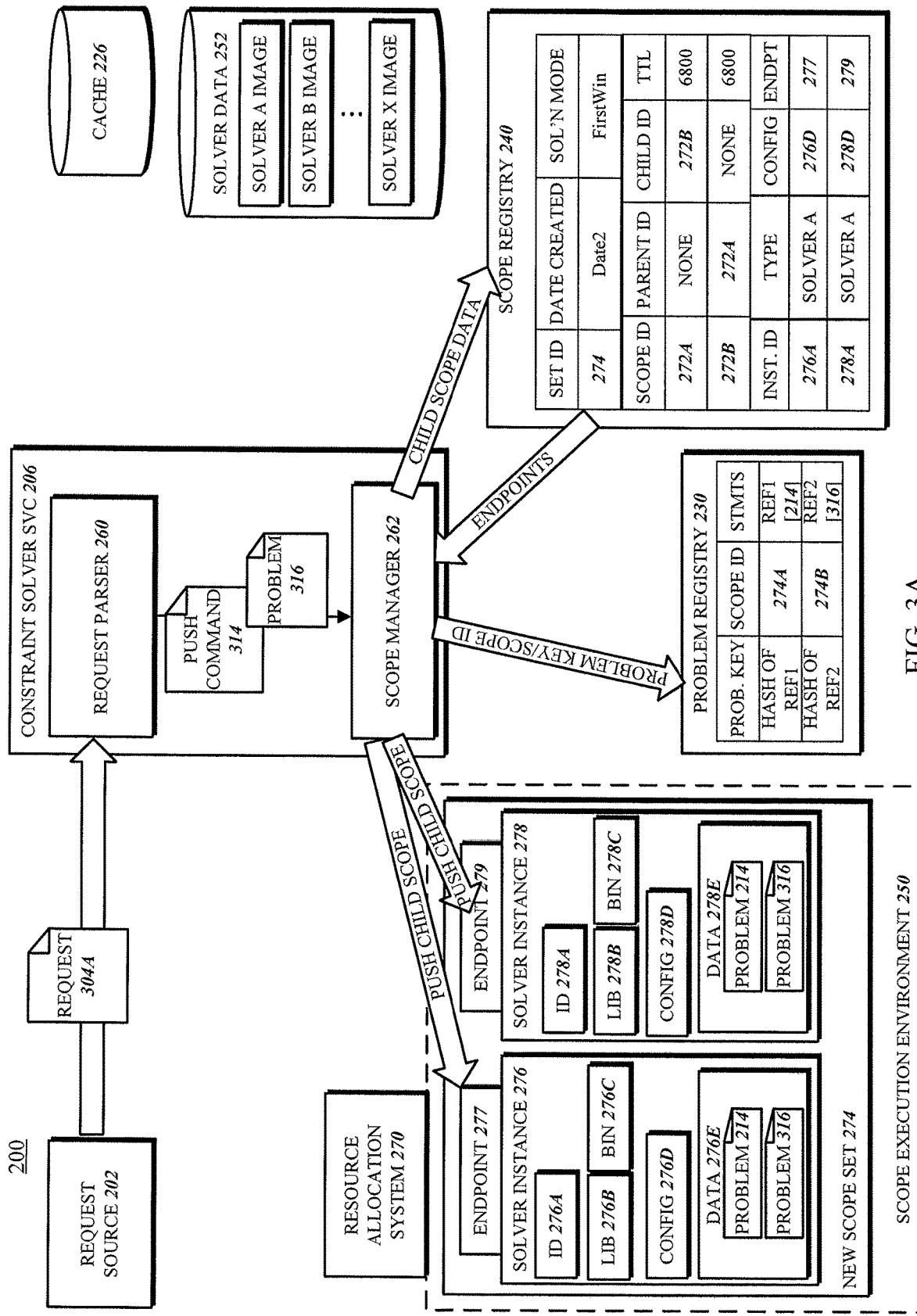
FIGS. 3A-D are diagrams illustrating another example data flow between components of the system, in accordance with this disclosure.

FIGS. 3A-D illustrate an example flow of data between system components in the computing environment 200 in order to process a "child scope" associated with the logic problem 214. A child scope coordinates the evaluation, by the deployed solvers, of one or more problem statements that may be "pushed" sequentially onto the "stack" of the initially-provided problem statements in the logic problem 214. In various embodiments, the use of scopes enables the evaluation of several different implementations of the logic problem by pushing the additional problem statements onto the stack, evaluating the modified logic problem, "popping" the additional problem statements from the stack, and then pushing another set of problem statements on the stack and re-evaluating the logic problem. Referring to FIG. 3A, the request source 202 submits a request 304A in which the request parser 260 identifies a "push" command 314 and a logic problem 316 comprising a set of additional problem statements that are compatible with the problem statements of the original logic problem 214. The scope manager 262 receives the push command 214 and the problem 316 and coordinates the creation of a corresponding child scope. For example, the scope manager 262 may: create an entry corresponding to the problem 316 in the problem registry 230, as described above; modify the entry in the scope registry 240 associated with the new scope set 274 to include the child scope, as described above; and, send the problem 316 to each of the deployed solvers, as described above.

In some embodiments, when a "parent" scope has an active child scope, the corresponding scope record (in the scope registry 240) may include information indicating as much; the scope manager 262 may use this information to manage the parent and child scopes. For example, if the constraint solver service 206 receives commands directed at the parent scope, the scope manager 262 may determine that the parent scope has an active child scope and deny the commands as invalid (i.e., the parent scope is inactive as long as the child scope is active).

Figure 3B:
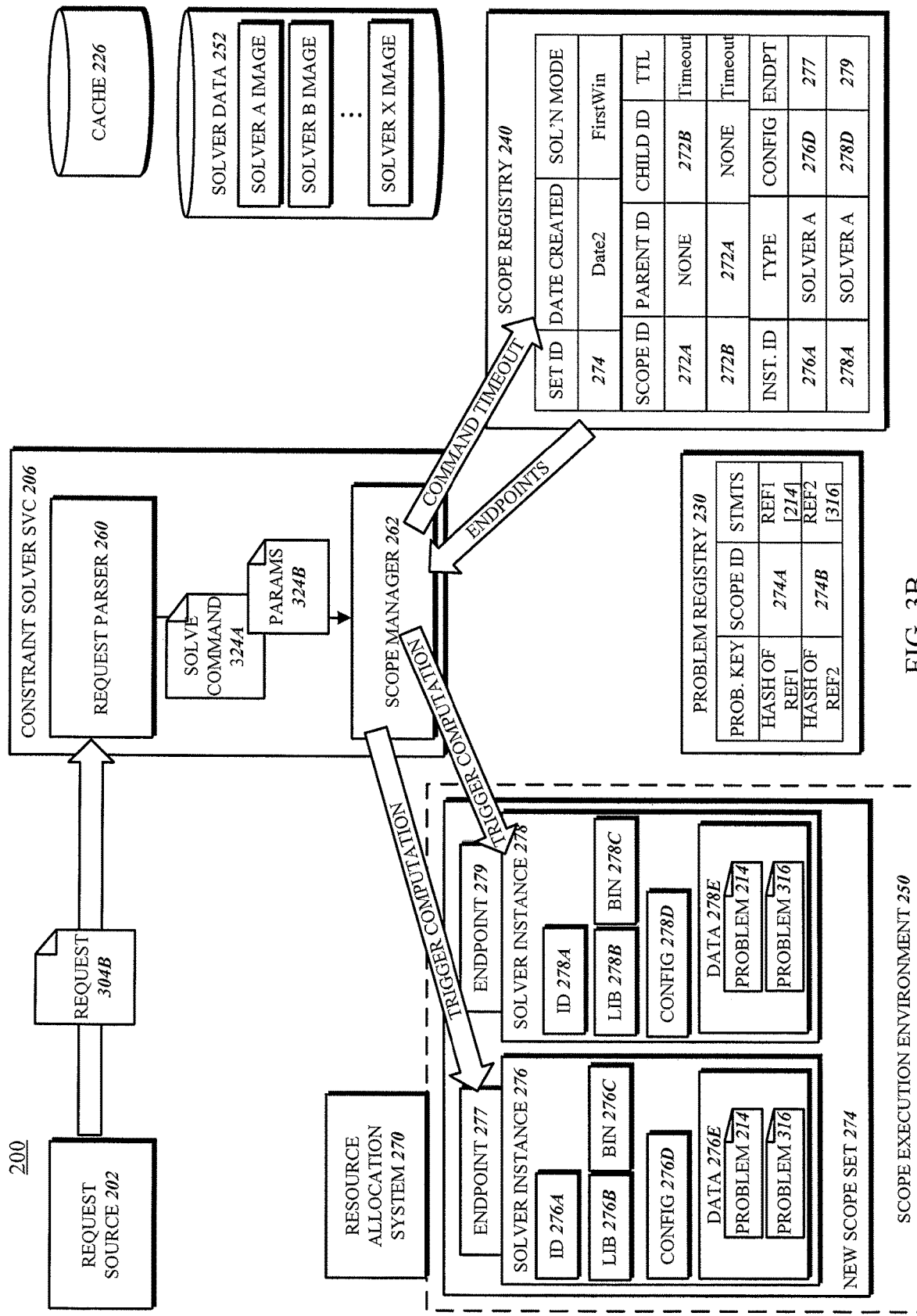
Figure 3C:
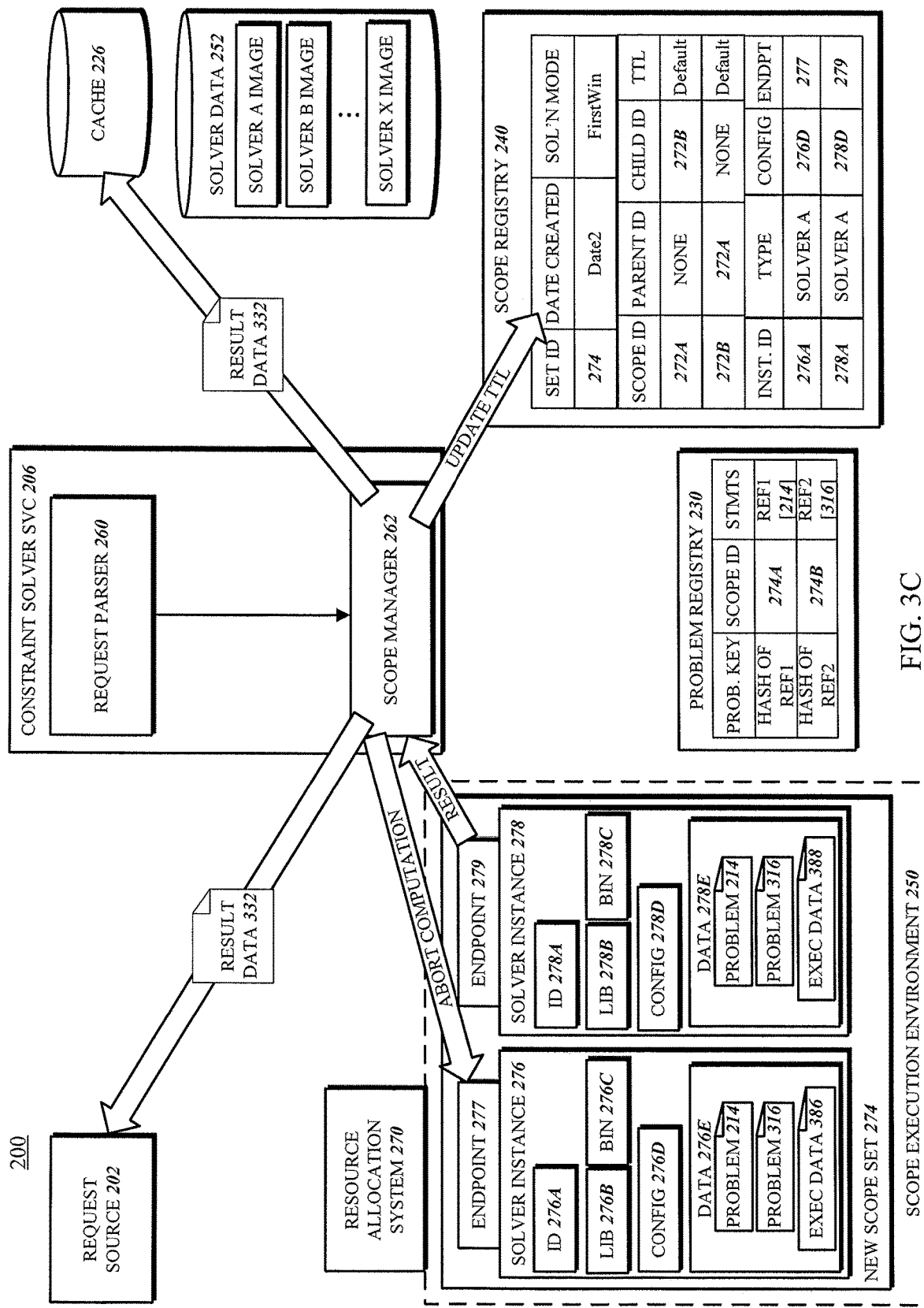
Figure 3D:
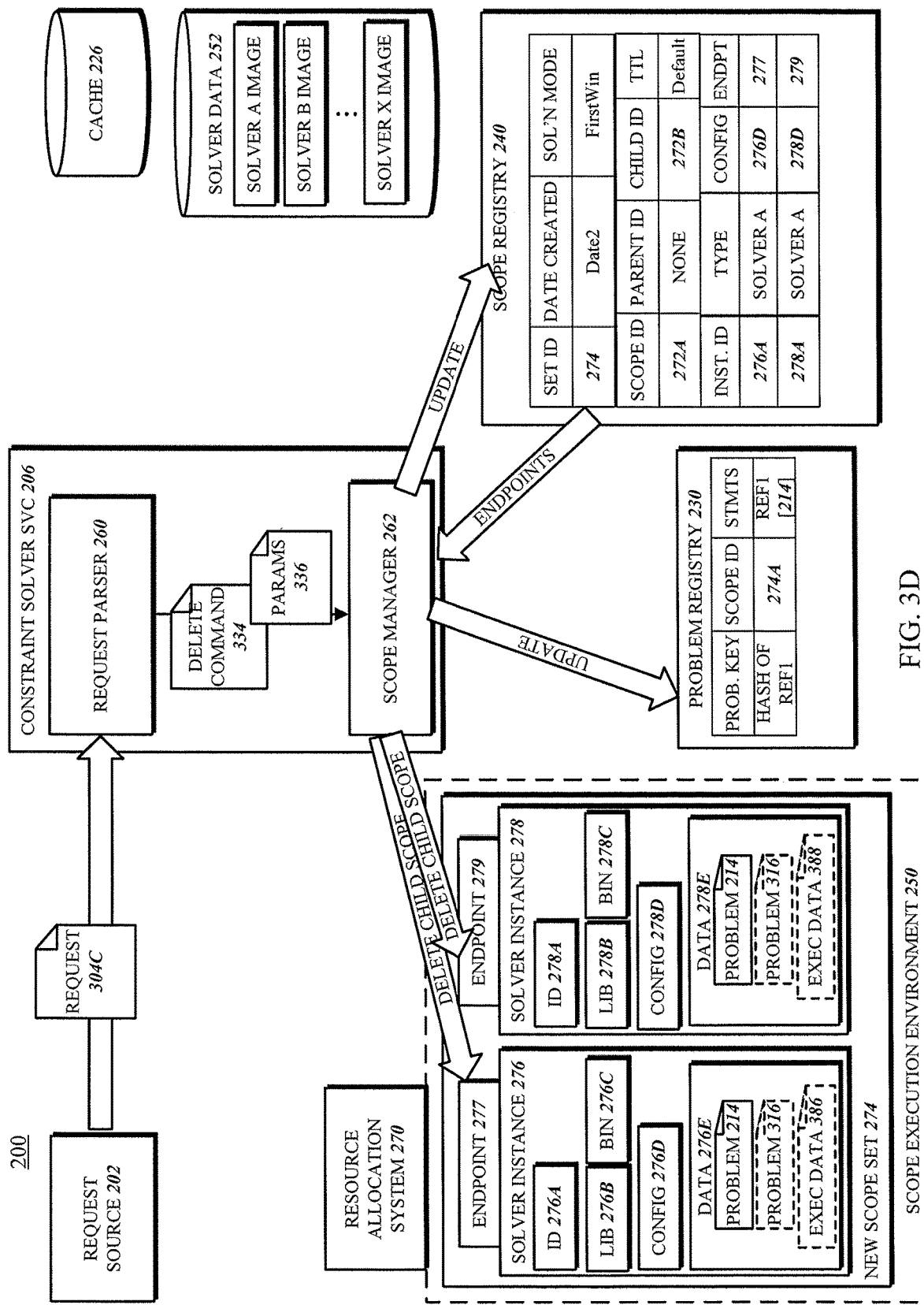

Referring to FIG. 3B, the constraint solver service 206 may receive and process a request 304B that includes a solve command 324A and corresponding parameters 324B as described above with respect to FIG. 2B. The scope manager 262 triggers the computation by the deployed solvers of the logic problem, now comprising the original problem 214 and the problem 316 associated with the child scope. Referring to FIG. 3C, the constraint solver service 206 may the process the computed result(s) in accordance with the solution aggregation strategy. In the illustrated example, the scope manager 262 implements the "FirstWin" strategy, sending the first-received result as result data 332 back to the request source 202 and the cache 226, and terminating the computations underway by the other solver(s). Finally, referring to FIG. 3D, the constraint solver service 206 may receive a request 304C; the request parser 260 may determine that the request 304C includes a delete command 334 and any parameters 336 associated with the delete command 334. In some embodiments, the delete command 334 removes a designated active child scope, in accordance with the parameters 336. For example, upon receiving the delete command 334, the scope manager 262 causes the deployed solvers/solver instances 276, 278 to delete the logic problem 316 associated with the child scope, and further to delete any execution data 386, 388 associated with computing results for the child scope; the scope manager 262 may also delete entries associated with the child scope from the problem registry 230 and scope registry 240.

Figure 4A:
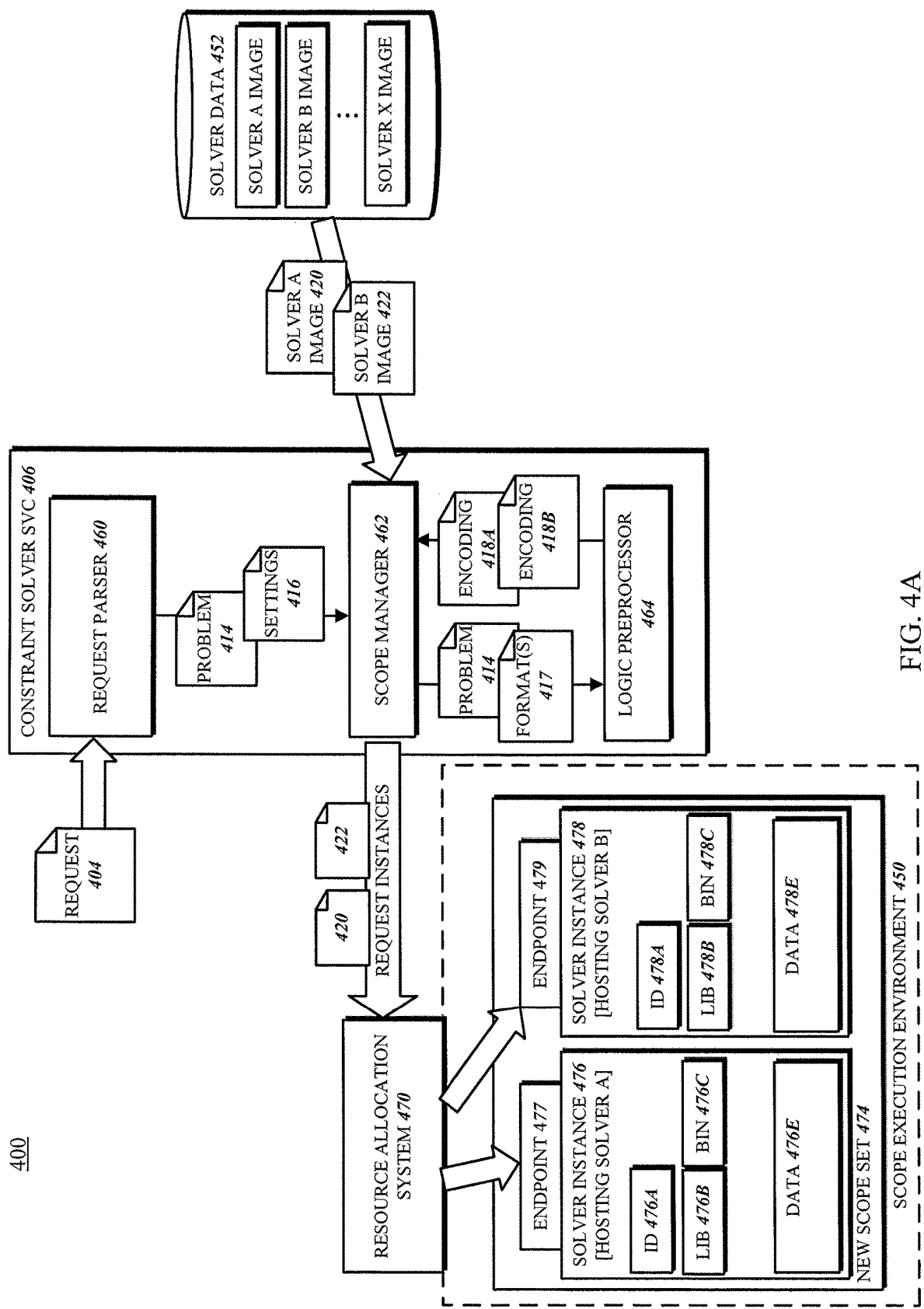
FIGS. 4A-B are diagrams illustrating another example data flow between a constraint solver service and an execution environment.
Figure 4B:
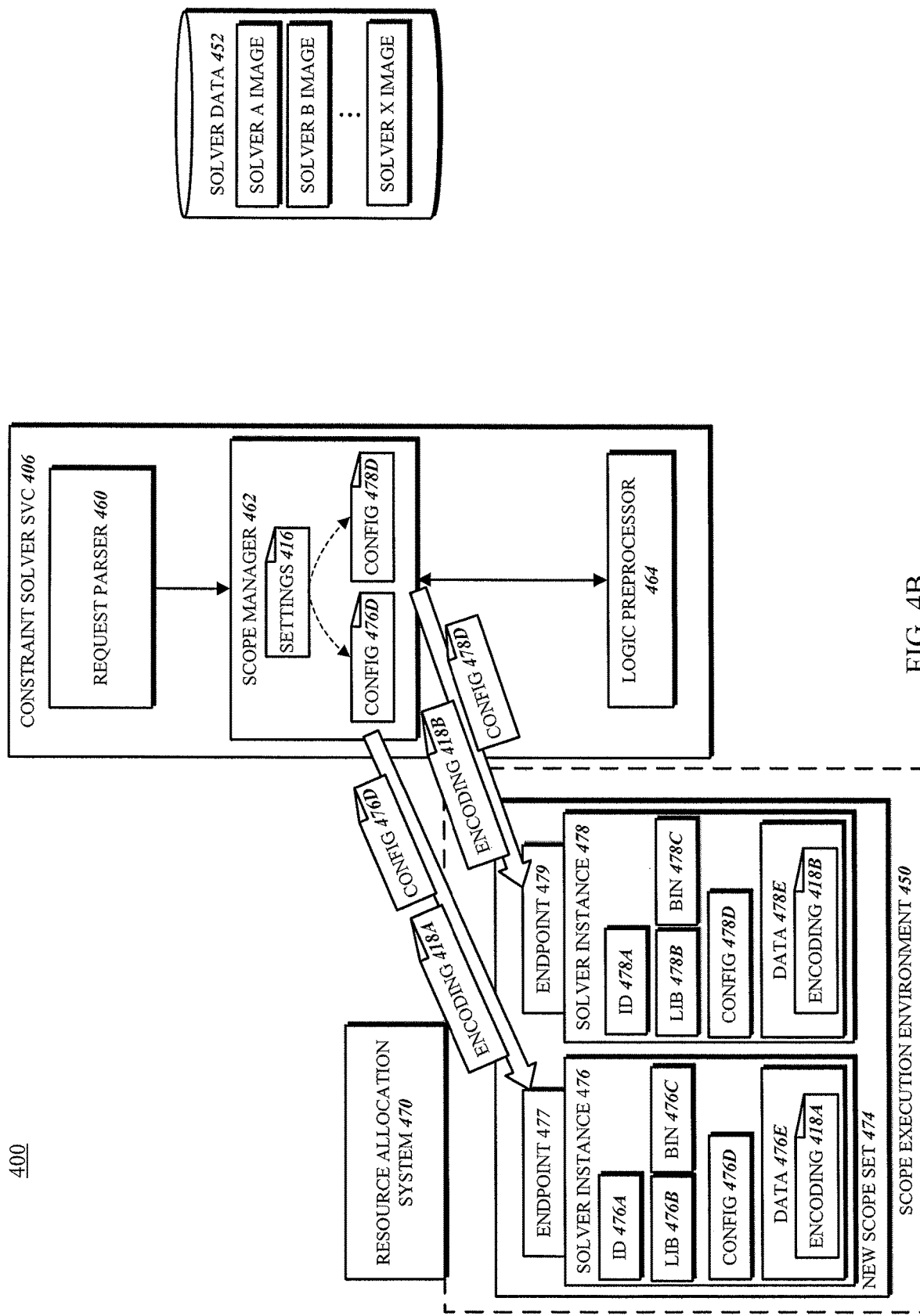

FIGS. 4A-B illustrate another embodiment of a constraint solver service 406 implemented in a computing environment 400 such as the computing resource service provider environment 100 of FIG. 1. The constraint solver service 406 includes a request parser 460 and a scope manager 462, and may further include a logic preprocessor 464. The request parser 460 may, as described above, process a request 404 to identify a logic problem 414 and one or more settings 416, if any. The scope manager 462 may determine that the logic problem 414 provided or referenced by the request 404 should be encoded before it is input into the solver(s) that the constraint solver service 406 will deploy in accordance with the request 404. For example, the scope manager 462 may determine, before or after obtaining the corresponding images 420, 422 from the solver data store 452, that SOLVER A and SOLVER B will be deployed to solve the logic problem 414; the scope manager 462 may identify one or more formats 417 that can be read by each of SOLVER A and SOLVER B, and may send the logic problem 414 and the format(s) 417 to the logic preprocessor 464.

The logic preprocessor 464 may be a propositional logic translator or another encoding module executable to translate a logic problem from its input format into one or more other formats and/or one or more other sets of problem statements readable by one or more of the solvers in the portfolio (i.e., SOLVERS A-X, for which solver images are stored in the solver data store 452). The logic preprocessor 464 may be a module of the constraint solver service 406 or may be deployed outside of the constraint solver service 406. The logic preprocessor 464 may include instructions for translating the logic problem 414 into one or more encodings 418A,B of the logic problem 414. An encoding comprises a set of problem statements representing the logic problem 414 and having a solver format (e.g., one of formats 417). In one embodiment, the logic problem 414 may be provided by the client in a syntax that is readable by the propositional logic translator 464, and the logic preprocessor 464 may create an encoding 418A,B for each of the deployed solvers. In another embodiment, the logic problem 414 may be provided in one of the available solver formats (e.g., SMT-LIB), and the logic preprocessor 464 may be configured to generate the encodings 418A,B as one or both of: the same or a substantially equivalent set of problem statements as in the logic problem 414, but in a different format 417; and, a set of problem statements in the format of the original logic problem 414, but differentiated according to the advantages of the corresponding solver. For example, SOLVER A may be a SMT solver that reads logic problems in SMT-LIB format, and SOLVER B may be a first-order logic solver that reads logic problems in a first-order logic format; the logic preprocessor 464 may receive a syntactically valid logic problem 414 and the identified formats 417 of SMT-LIB and first-order logic, and may produce a first encoding 418A comprising a set of problem statements in SMT-LIB format and a second encoding 418B comprises a set of problem statements in first-order logic format. In another example, multiple instances of the same or different SMT solvers having the same or different configurations may be deployed, and the logic problem 414 may be provided in SMT-LIB format; the logic preprocessor 464 may generate multiple encodings of the logic problem 414 each in SMT-LIB format, but a first encoding will comprise a first set of problem statements representing the logic problem 414 and a second encoding will comprise a second set of problem statements representing the logic problem 414 in a different way. For example, the problem statements of the first encoding may be designed to invoke a first built-in solver theory to solve the logic problem 414, and the problem statements of the second embodiment may be designed to invoke a second built-in solver theory to solve the logic problem 414.

In some embodiments, the logic preprocessor 464 may receive the logic problem 414 as an object used by one or more services. For example, the logic problem 414 may be a security policy comprising one or more permission statements. The logic preprocessor 464 may obtain a permission statement (e.g., in JSON format) and convert the permission statement into one or more constraints described using propositional logic. The constraints may be described in various formats and in accordance with various standards such as SMT-LIB standard formats, CVC language, and Center for Discrete Mathematics and Theoretical Computer Science (DIMACS) formats.

For example, a permission statement (e.g., a permission statement included as part of a security policy) may be described as:

```
"Statement": [
{
  "Effect": "Allow",
  "Resource": *,
  "Principal": *,
  "Action": "put*"
} ]
```

The corresponding propositional logic constraints generated from the example policy statement may be described as:

```
(assert policy.statement.resource)
(assert policy.statement.principal)
(assert (= policy.statement.action (or (and (= "storage"
actionNamespace) (str.prefixof "put" actionName)))))
(assert (= policy.statement.effect.allows (and policy.
statement.action policy.statement.resource policy.statement.principal)))
(assert (not policy.statement.effect.denies))
(assert (= policy.allows (and (not policy.denies) policy.
statement.effect.allows)))
(assert (= policy.denies policy.statement.effect.denies))
```

The propositional logic expressions generated by the logic preprocessor 464 may represent an encoding comprising a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled.

The encoding of a single permission statement as a set of propositional logic expressions may be extended to an encoding process for a complete logic problem. For example, the logic problem may be a comparison of two security policies, P0 and P1, to determine whether any valid request to access a data storage service exists that would be allowed by P0 and denied by P1. For simplicity, the policies each contain one permission statement in which the relevant portion is: for P0, any call to a storage service API that references the "storage" action namespace is allowed; and, for P1, only calls to storage service APIs that reference the "storage" action namespace and that request an API that begins with "get" are allowed. The APIs and resources operate in a computing environment where the only valid action namespace for storage service resources is "storage," and the only valid service for calls referencing the "storage" action namespace is the data storage service. The logic preprocessor 464 may encode this logic problem as the following set of propositional logic statements in SMT-LIB format:

```
(set-logic ALL)
(declare-const actionName String)
(declare-const actionNamespace String)
(declare-const resource_service String)
(declare-const P0.statement.action Bool)
(assert (= P0.statement.action (= "storage" actionNamespace)))
(declare-const P0.denies Bool)
(assert (not P0.denies))
(declare-const P0.allows Bool)
(assert (= P0.allows (and (not P0.denies) P0.statement.action)))
(declare-const P0.neutral Bool)
(assert (= P0.neutral (and (not P0.allows) (not P0.denies))))
(declare-const P1.statement.action Bool)
(assert (= P1.statement.action (and (= "storage" actionNamespace) (str.prefixof "get" actionName))))
(declare-const P1.denies Bool)
(assert (not P1.denies))
(declare-const P1.allows Bool)
(assert (= P1.allows (and (not P1.denies) P1.statement.action)))
(declare-const P1.neutral Bool)
(assert (= P1.neutral (and (not P1.allows) (not P1.denies))))
(assert (= (= resource_service DataStorageService)
       (= actionNamespace "storage")))
(assert p0.allows)
(assert (not p1.allows))
```

The logic preprocessor 464 may send the encoding(s) 418A,B back to the scope manager 462.

Still referring to FIG. 4A, before, concurrently with, and/or after the creation of the encodings 418A-B, the scope manager 462 may coordinate the instantiation of the new scope set 474 in the scope execution environment 450. In some embodiments, the scope manager 462 may send resource requests, including or referencing the solver images 420, 422, to the resource allocation system 470; the resource requests cause the resource allocation system 470 to launch a first solver instance 476 (with a corresponding communication endpoint 477 and assigned a physical identifier 476A) from the SOLVER A image 420 and a second solver instance 478 (with a corresponding communication endpoint 479 and assigned a physical identifier 478A) from the SOLVER B image 422. As described above, launching the instances from the solver images may include installing the corresponding software for the solver in the instance; thus, the first solver instance 476 hosts the object libraries 476B and binary/executable files 476C of SOLVER A, and the second solver instance 478 hosts the object libraries 478B and binary/executable files 478C of SOLVER B. Referring to FIG. 4B, once the solver instances 476, 478 are deployed, the scope manager 462 may send data (e.g., commands directly to the executing solvers) via the endpoints 477, 479; in some embodiments, the scope manager 462 may determine (e.g., from the settings 416) a configuration 476D for SOLVER A and a configuration 478D for SOLVER B, and may send the appropriate commands to apply the configurations 476D, 478D, and the scope manager 462 may also push the encoding 418A for SOLVER A to the first solver instance 476 and the encoding 418B for SOLVER B to the second solver instance 478, for immediate processing by the corresponding solver or for storage in the corresponding logical storage volume 476E, 478E.

Subsequently, the scope manager 462 may receive and issue a "solve" command to the deployed solvers as described above, causing the solvers to compute one or more solutions to the logic problems (i.e., as represented by the distributed encoding(s) 418A,B). SMT-LIB and other solver input/output formats/languages may have more than one native "solve" command, and/or may receive arguments to the solve command. For example, the SMT-LIB "check-sat" command instructs an SMT solver to evaluate the logic problem and determine whether its constraints can be satisfied; the result is a Boolean value indicating the problem is satisfiable ("SAT") or unsatisfiable ("UNSAT"), or an error occurred or the result could not be determined ("UNKNOWN"). The SMT-LIB "get-model" command instructs an SMT solver to generate, during the computation, one or more models comprising an interpretation of the logic problem that makes all problem statements in the logic problem true. These two solve commands can be issued together. For example, sending both solve commands to a solver configured to evaluate the above example encoding of the P0, P1 comparison problem may produce the following result:

```
SAT
(model
    (define-fun actionName ( ) String "")
    (define-fun actionNamespace ( ) String "storage")
    (define-fun resource_service ( ) String "storage")
    (define-fun P0.statement.action ( ) Bool true)
    (define-fun P0.denies ( ) Bool false)
    (define-fun P0.allows ( ) Bool true)
    (define-fun P0.neutral ( ) Bool false)
    (define-fun P1.statement.action ( ) Bool false)
    (define-fun P1.denies ( ) Bool false)
    (define-fun P1.allows ( ) Bool false)
    (define-fun P1.neutral ( ) Bool true)
)
```

Figure 5:
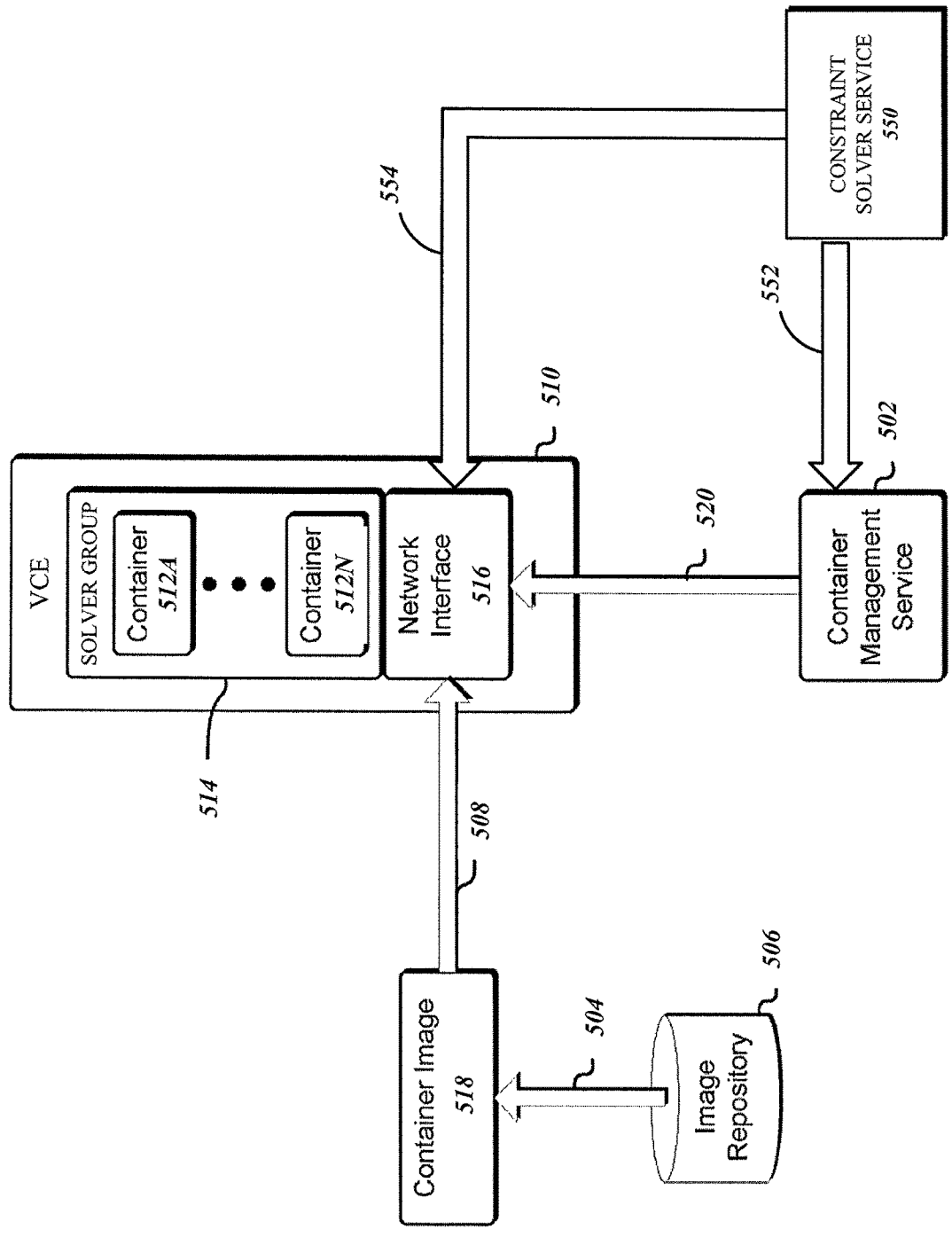
FIG. 5 is a diagram illustrating another example data flow between a constraint solver service and a container management service of a computing resource service provider.

FIG. 5 illustrates an example environment 500 where a container within a container instance is instantiated using a container management service 502 of the computing resource service provider. The container management service 502 may be the resource allocation system described above, or may communicate with one or more resource allocation systems to launch container instances into one or more virtual computing environments implemented in the environment 500. The container management service 502 may be a collection of computing resources that operate collectively to process logic problems, problem statements, encodings, solver configurations, and solver commands to perform constraint solver tasks as described herein by providing and managing container instances where the tasks and the associated containers can be executed. The computing resources configured to process such data/instructions and provide and manage container instances where the solvers and the associated containers can be executed include at least one of: computer systems (the computer systems including processors and memory), networks, storage devices, executable code, services, processes, modules, or applications, as well as virtual systems that are implemented on shared hardware hosted by, for example, a computing resource service provider. The container management service 502 may be implemented as a single system or may be implemented as a distributed system, with a plurality of instances operating collectively to process data/instructions and provide and manage container instances where the solvers and the associated containers can be executed. The container management service 502 may operate using computing resources (e.g., other services) that enable the container management service 502 to receive instructions, instantiate container instances, communicate with container instances, and/or otherwise manage container instances.

The container management service 502 may be a service provided by a computing resource service provider to allow a client (e.g., a customer of the computing resource service provider) to execute tasks (e.g., logic problem evaluation by a constraint solver) using containers on container instances as described below. The computing resource service provider may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services, and/or other such services. Not all embodiments described include all of the services described and additional services may be provided in addition to, or as an alternative to, services explicitly described.

As described above, a constraint solver service 550 in accordance with the described systems may direct 552 the container management service 502 to instantiate containers, and/or to allocate existing idle solver containers, that provide an execution environment for constraint solvers to compute solutions to a logic problem submitted to the constraint solver service 550. The constraint solver service 550 may provide the container management service 502 with the information needed to instantiate/allocate containers 512A-N and associate them in a solver group 514 (i.e., a scope set as described above). Alternatively, the constraint solver service 550 may logically create the solver group 514 by receiving the N physical identifiers of the containers 512A-N allocated for the logic problem, and creating a record (i.e., a scope record in the scope registry described above) including the N physical identifiers in association with each other. The information needed to instantiate containers associated with the logic problem may, for example, identify a set of resource parameters (e.g., a CPU specification, a memory specification, a network specification, and/or a hardware specification) as described below. The information may also include a container image, or an image specification (i.e., a description of an image that may be used to instantiate an image), or a location (e.g., a URL, or a file system path) from which the container image can be retrieved. An image specification and/or a container image may be specified by the client, specified by the computing resource services provider, or specified by some other entity (e.g., a third-party). The container management service 502 may instantiate containers in a cluster or group (e.g., solver group 514) that provides isolation of the instances. The containers and the isolation may be managed through application programming interface ("API") calls as described herein.

In some examples, a container instance (also referred to herein as a "software container instance") may refer to a computer system instance (virtual or non-virtual, such as a physical computer system running an operating system) that is configured to launch and run software containers. Thus, the container instance may be configured to run tasks in containers in accordance with a task definition. For example, a task may comprise computation, by a plurality of deployed instances of one or more solvers, of one or more solutions to a logic problem; the task definition for this task may include the logic problem (including problem statements added and removed in connection with child scopes), the number N of solver instances to deploy, and the type and configuration of the solver executing on each solver instance. One or more container instances may comprise an isolated cluster or group of containers. In some examples, "cluster" may refer to a set of one or more container instances that have been registered to (i.e., as being associated with) the cluster. Thus, a container instance may be one of many different container instances registered to the cluster, and other container instances of the cluster may be configured to run the same or different types of containers. The container instances within the cluster may be of different instance types or of the same instance type. A client (e.g., a customer of a computing resource service provider) may have more than one cluster. Thus, the constraint solver service 550 may, on behalf of the client, launch one or more clusters and then manage user and application isolation of the containers within each cluster through application programming interface calls.

A container (also referred to as a "software container") may be a lightweight virtual machine instance running under a computer system instance that includes programs, data, and system libraries. When the container is run (or executed), the running program (i.e., the process) is isolated from other processes running in the same computer system instance. For example, a container 512A configured as a solver instance may have, among other processes, a daemon that launches a configuration of the constraint solver installed on the container 512A, and supervises its execution; the daemon may also provide communication capabilities through the container's 512A endpoint, allowing the constraint solver service 550 to send commands and requests to the executing solver (e.g., via remote procedure calls). Thus, containers may each run on an operating system (e.g., using memory, CPU, and storage allocated by the operating system) of the container instance and execute in isolation from each other (e.g., each container may have an isolated view of the file system of the operating system). Each of the containers may have its own namespace, and applications running within the containers are isolated by only having access to resources available within the container namespace. Multiple containers may run simultaneously on a single host computer or host virtual machine instance. A container encapsulation system allows one or more containers to run within a single operating instance without overhead associated with starting and maintaining virtual machines for running separate user space instances; the resources of the host can be allocated efficiently between the containers using this system.

The container management service 502 may allocate virtual computing resources of a virtual computing environment (VCE) 510 for the containers 512A-N and for at least one network interface 516 attached to the solver group 514 or directly to the containers 512A-N. Via the network interface 516, the container management service 502 may cause a container image 518 to be identified 504, retrieved 508 from an image repository 506, and used to instantiate one or more of the containers 512A-N; that is, the constraint solver software contained or described by the container image 518 may be installed on a container 512A to make the container 512A a solver instance hosting an executable version (i.e., copy) of the constraint solver. The container management service 502 may repeat the instantiation process, using the same container image 518 or other container images in the image repository 506, until N solver instances have been deployed (i.e., as containers 512A-N). In some embodiments, the network interface 516 may provide, or route communications to, an endpoint for each of the containers 512A-N; the constraint solver service 550 may send 554 data, such as configuration commands, encodings of the logic problem, and execution commands, to the endpoints via the network interface 516.

Figure 6:
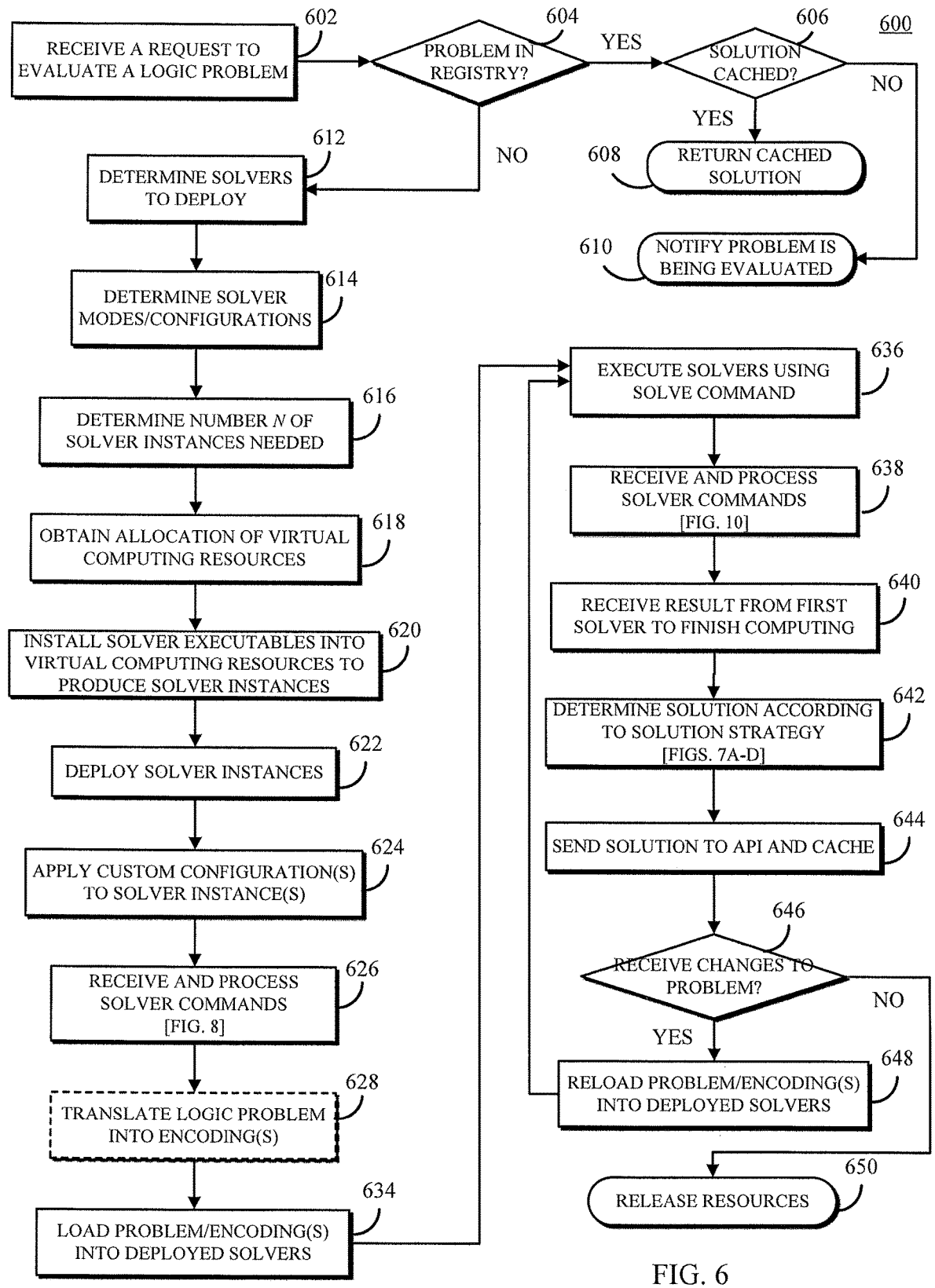
FIG. 6 is a flowchart illustrating an example method of using a plurality of constraint solver instances to efficiently and accurately evaluate logic problems, in accordance with the present disclosure.

FIG. 6 illustrates an example method 600 that can be performed by the system (i.e., by computer processors executing program instructions stored in memory to implement a constraint solver service) to evaluate a provided logic problem using a plurality of constraint solvers and obtain a solution comprising one or more results produced by the constraint solvers. At 602, the system may receive a request to evaluate a logic problem associated with a problem source (i.e., a user of the computing resource service provider, or a service of the computing resource service provider). For example, the system may provide an API for the constraint solver service as described above, and may receive the request via the API. The system may obtain the logic problem via the request. For example the system may determine that the first request includes a first set of problem statements describing at least a first portion of the logic problem. An example of such a request is described above. The problem statements may be provided in plain text embodied in the request, or in a file attached to the request, or in a file stored in a data storage location identified (e.g., referenced) in the request. The logic problem may be provided by the problem source, as described above, and may initially be provided in a format readable by one or more of the available solvers (e.g., SMT-LIB) or may require conversion into a readable format as described above with respect to the logic preprocessor 464 of FIGS. 4A-B.

Once the system obtains the logic problem, at 604 the system may determine whether the problem is represented by a record in the problem registry. For example, as described above the problem registry may include a record for each logic problem that is either being presently (i.e., at the time the request is received (602)) evaluated by the system, or has a cached solution, and the identifier for each logic problem may comprise a hash value generated by applying a hashing function to the logic problem's problem statements; the system may produce the corresponding hash value for the received logic problem, and compare the hash value to the identifiers in the problem registry records to determine a match. If there is a match, in some embodiments the logic problem is either being evaluated or has a cached solution. At 606, the system may determine whether the solver service's cache layer is storing a previously computed solution for the logic problem. For example, the system may use the hash value obtained at 604, or another identifier of the corresponding problem registry record, to determine whether a record associated with the logic problem exists in the cache. If so, at 608 the system may obtain the cached solution and return it to the requestor (e.g., to the user that provided the logic problem, via the corresponding API). If there is no cached solution for the logic problem, in some embodiments that means the logic problem is currently being evaluated by the system (i.e., via deployed solvers); at 610 the system may send a notification to the problem source indicating that the logic problem is being evaluated.

If the logic problem is not in the problem registry, the system may create a new problem registry record for the logic problem and then begin solver deployment for evaluation of the logic problem. At 612, the system may select, based at least in part on the first request, one or more solvers from a plurality of available constraint solvers configured to be installed by the system. For example, the request may include a data structure or table identifying which solvers to use, as described above with respect to the example request; in this case, the system may be configured to read the data structure and determine which solvers are identified. In another embodiment, the system may access other data structures describing solver selection, such as a default set of solvers, a custom set identified from user preferences submitted by the client, or a set of user input received via an API that prompts the user to select which solvers to use. Similarly, at 614, the system may determine how to configure each solver, and may at 616 determine the number N of solver instances that should be deployed to fulfill the request and evaluate the logic problem. The same data used at 612 may be used at 614 and 616. For example, the solver data structure in the request may include N solver definitions each identify which solver to use, which mode to execute the solver in, and which configuration parameters to apply. In another example, the system may provide in the API interactive functions prompting the client to select the desired solvers and/or solver configurations, and the system may determine the number N based on the user input responsive to the API prompt. In some embodiments, operation of one or more of the deployed constraint solvers is configurable by setting values of a set of configuration parameters. At 614, the system may determine (e.g., based on information in the request) one or more configurations of the set of configuration parameters. For example, the system may provide in the API interactive functions prompting the client to enter values for the configuration parameters of one or more of the selected solvers, and the system may determine, from the user input responsive to the API prompt, one or more configurations each comprising corresponding values for a set of configuration parameters.

At 618, the system may obtain one or more allocations of virtual computing resources in a virtual computing environment suitable for executing the solvers of the N solver instances. For example, the system may communicate with a container management system of the computing resource service provider to cause the container management system to determine that the necessary resources are available, and that the service and the requesting user are authorized to use the resources; the container management system may then provision virtual computing resources comprising the necessary container instances for use by the system. At 620, the system may install the solvers into the container instances to produce the solver instances. For example, system memory may store, for each of the available constraint solvers configured to be installed by the system, corresponding software resources needed to install the available constraint solver as an executable program (e.g., as a container image or another software installation package); the system may cause the container management system to obtain one or more container images each associated with a corresponding solver of the one or more solvers, the one or more container images each comprising software and data needed to install the corresponding solver, and then to install one of the one or more container images into each of the plurality of container instances to produce a plurality of solver instances each configured to operate one of the one or more solvers as an executable program, such that each of the one or more solvers corresponds to at least one of the plurality of solver instances. At 622, the system may cause the container management system to deploy the plurality of solver instances into a virtual computing environment of the computing resource service provider. The system may then apply (624) the configurations (i.e., determined at 614) to the corresponding deployed solvers. For example, the system may cause a first solver instance to operate a first solver using a first configuration, and cause a second solver instance to operate the first solver using a second configuration.

At 626, the system may optionally receive and process one or more solver commands that prepare the deployed solvers for execution. For example, the request may include one or more commands, or the user may submit one or more commands via the API, and the system may correlate each received command to a corresponding solver command. These processes are described in detail below with respect to FIG. 8. At 628, optionally the system may determine that, based on requirements associated with at least one of the plurality of available constraint solvers, one or more encodings of the logic problem are needed, and may translate the logic problem into the encoding(s). For example, to encode the logic problem to be read by two different solvers, the system may generate a first encoding as a first set of problem statements representing the logic problem and formatted in a first format readable by the first solver, and generate a second encoding of the one or more encodings, the second encoding comprising a second set of problem statements representing the logic problem and formatted in a second format readable by a second solver of the one or more solvers, the second solver executing on a second solver instance of the N solver instances, the second solver instance storing the second encoding. In another example, the system may generate multiple encodings in the same format, but having different problem statements defining the logic problem in different but equivalent or substantially equivalent ways. At 634, the system may send the proper encoding of the logic problem to each of the plurality of solver instances. For example, the system may use an endpoint assigned to each solver instance that exposes the corresponding solver to the system, allowing the system to make remote procedure calls to the solver; the system may use the endpoint to send the properly formatted problem statements to each deployed solver.

At 636, the system may send to each of the plurality of solver instances a solve command that causes the corresponding solver operated by the solver instance to evaluate the logic problem (e.g., represented by the encoding stored by the solver instance) and produce a corresponding result. In some embodiments, the solve command may be received by the system at 626, such as when the user submits an API call that includes the logic problem as well as the solve command. In other embodiments, the system may be configured to automatically issue the solve command after successfully loading the logic problem into each solver instance, or the system may receive the solve command from the problem source (e.g., from the user via the API) after loading the logic problem into the solvers. The system may, for example, use the solver instances' endpoints to issue a remote procedure call including the corresponding solve command for each deployed solver. As a result, the solvers begin executing against the logic problem. During this evaluation, at 638 the system may receive one or more additional solver commands; example methods of processing such in-stream solver commands are described in detail below with respect to FIG. 10.

At 640, the system may obtain a first result produced by a first solver of the one or more solvers, the first solver operated by a first solver instance of the plurality of solver instances. For example, the system may receive the result from the first solver to finish executing against the logic problem; in other embodiments, the system may periodically (e.g., once per second, or once per minute, etc.) poll the executing solvers to determine whether their calculations are complete, receiving the corresponding result once it is generated. The system may perform one or more actions associated with obtaining the first result; in some embodiments, the appropriate action(s) are specified in the solution aggregation strategy identified by the problem source, selected by the system, or otherwise predetermined. At 642, the system may use the selected solution aggregation strategy to determine a solution to the logic problem. Non-limiting examples of solution aggregation strategies, and the corresponding system operations, are described herein, including those described below with respect to FIGS. 7A-D. In some embodiments, the system may provide in the API interactive functions prompting the client to select the preferred solution aggregation strategy, and the system may determine which strategy to use from the user input responsive to the API prompt. To determine the solution to the logic problem, the system may process one or more of the results (up to N results may be generated) received from the solvers according to the identified solution strategy to produce the solution. At 644, the system may send the solution or information describing the solution to the client (e.g., via the API), and/or to other storage, such as the cache checked at 606.

In some embodiments, the evaluation is complete after 644. In other embodiments, the system may enable the problem source to make changes to the logic problem and have the updated logic problem reevaluated to produce different, perhaps more efficient or more useful, solutions. For example, the system's API may enable the user to create one or more child scopes of the currently executing scope, and to delete a current child scope, by pushing additional problem statements onto (or pulling/popping problem statements from) the stack of problem statements being evaluated. If at 646 the system receives changes to the problem (or otherwise determines that the logic problem includes multiple scopes), at 648 the system may re-encode (i.e., at 628 if necessary) the updated logic problem and reload the new encodings/problem statements in to the deployed solvers. The system may then return to 636 to again execute the solvers against the updated logic problem. Once no further post-solution changes to the problem are received (646), at 650 the system may release the virtual computing resources allocated to the system for solving the logic problem. For example, the system may cause the container management service to delete some or all of the container instances hosting the solvers; additionally or alternatively, to reuse the solver instances for another logic problem later, the system may instruct (e.g., via remote procedure call) the deployed solvers to delete all local data associated with the completed logic problem evaluation and to enter an idle state.

Figure 7A:
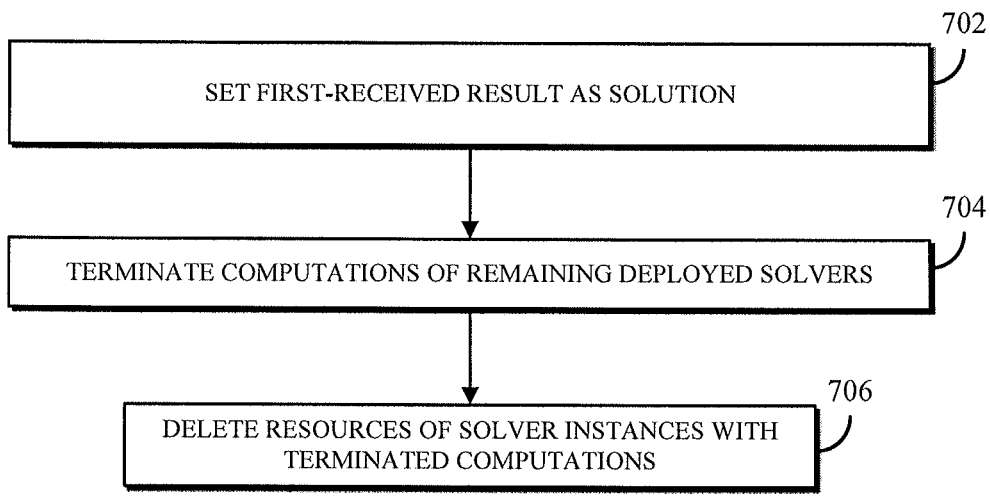
FIGS. 7A-D are flowcharts illustrating example methods of generating solutions to logic problems using a system of the present disclosure.

The methods of FIGS. 7A-D are examples of determining a solution according to a predetermined solution aggregation strategy (i.e., 642 of FIG. 6). FIG. 7A illustrates an example method 700 that can be performed by the system (i.e., by processors executing program instructions to implement a constraint solver service) to execute a "FirstWin" solution aggregation strategy in which the first result received is used as the solution. At 702, the system may set the first result produced before the corresponding result of any other solver instance of the plurality of solver instances as the solution. The system may send a notification to the problem source (e.g., via the API) indicating that the first result is available. At 704, the system may send, to each of the plurality of solver instances (excluding the solver instance that produced the first result, in some embodiments), a terminate command that causes the corresponding solver operated by the solver instance to abort execution of the solve command and stop evaluating the logic problem. The terminate command (or another command that the system sends at 706) may further cause the solvers/solver instances to delete resources, such as stored solution data, associated with the computations that were terminated/aborted. This method 700 allows the virtual computing resources allocated to the logic problem evaluation to be released as soon as possible, and either reused for another logic problem evaluation or deprovisioned entirely and returned to the pool of available resources as described above.

Figure 7B:
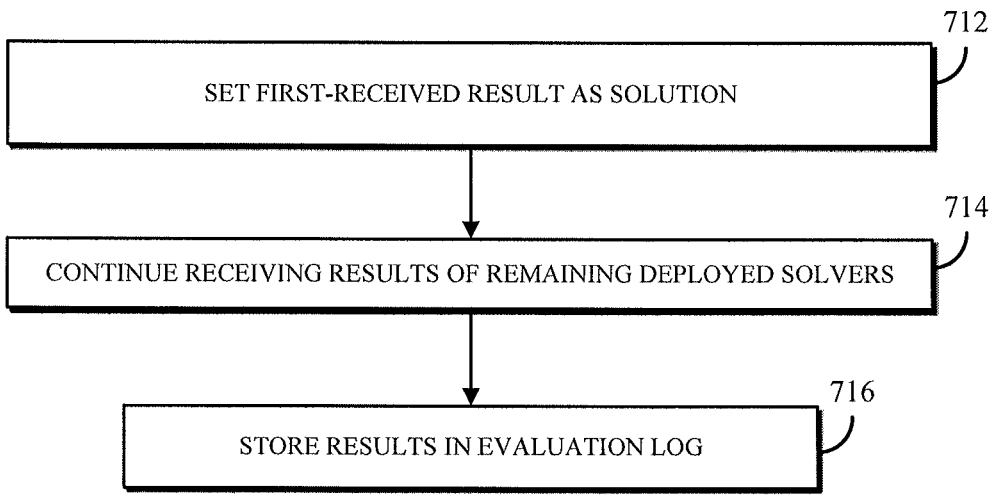

FIG. 7B illustrates another example method 710 that can be performed by the system (i.e., by processors executing program instructions to implement a constraint solver service) to execute a "FirstWin" solution aggregation strategy. As in the method 700 of FIG. 7A, the system may set the first-received result as the solution (712); however, the system may then continue receiving (714) results from the remaining deployed solvers. Once all or the desired results are received, the system may store (716) the results (e.g., in an evaluation log or a data structure) and/or send them to the user. In one example, a first instance of a first solver may be configured to produce a Boolean result, and a second instance of the first solver may be configured to produce one or more models as a result; the system may receive the Boolean result first, and may generate a first notification comprising the Boolean result. At some point, the system may determine that the second instance of the first solver has finished executing (i.e., producing the model(s)), and may obtain the model(s) and generate a second notification to the client comprising the model(s).

Figure 7C:
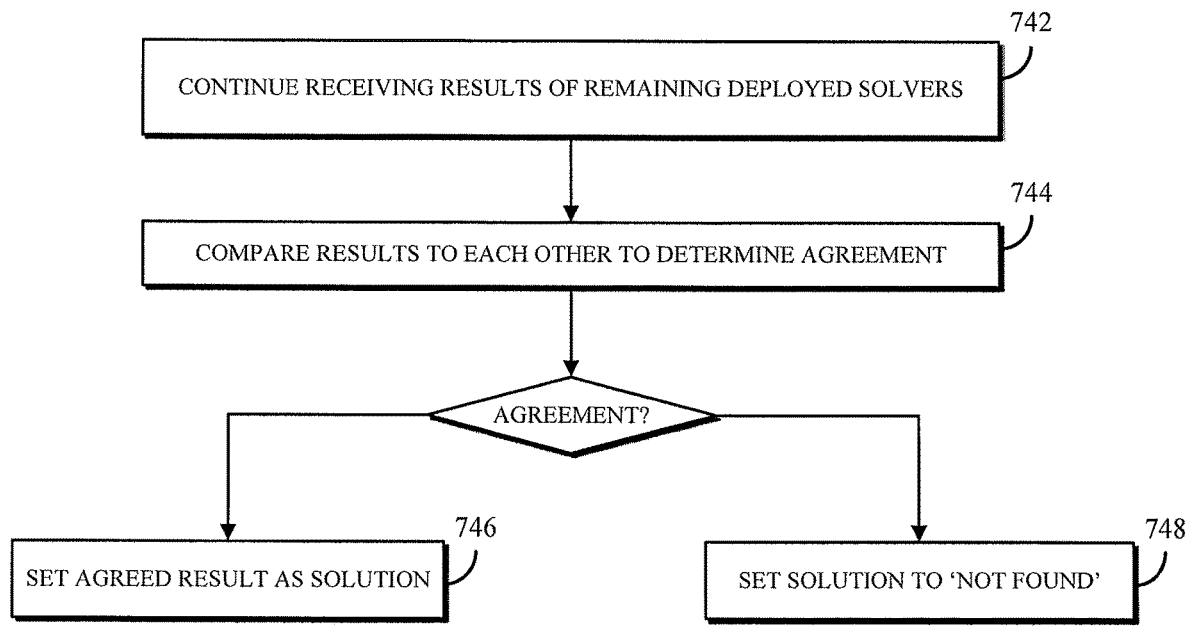

FIG. 7C illustrates an example method 740 that can be performed by the system (i.e., by processors executing program instructions to implement a constraint solver service) to execute a "CheckAgreement" strategy wherein the system validates the solution by checking the results against each other. At 742, the system may receive the results produced by the remaining solver instances. At 744, the system may compare the N corresponding results to each other to determine agreement. For example, each of the one or more solvers may produce, as the corresponding result, one of three values: a positive value indicating the logic problem is satisfiable; a negative value indicating the logic problem is unsatisfiable; or, an error value indicating the solver execution failed or the solver could not determine satisfiability. The comparison (744) may determine whether all of the results have the same "agreed" value. If there is an agreed value, at 746 the system may set the agreed value as the solution and generate a notification comprising the agreed value. If there is no agreed value, at 748 the system may set the solution to a value indicating a valid solution was not found, and generate a corresponding notification.

Figure 7D:
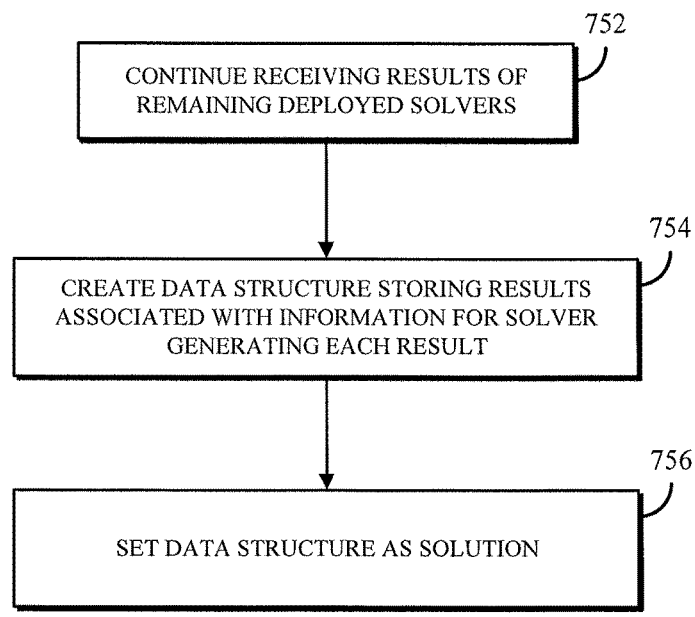

FIG. 7D illustrates an example method 750 that can be performed by the system (i.e., by processors executing program instructions to implement a constraint solver service) to execute a "CollectAll" strategy wherein the system returns all N results as the solution. At 752, the system may receive the results produced by the remaining solver instances. At 754, the system may create a data structure storing each of the N corresponding results associated with identifying information of the corresponding solver that produced the result. At 756, the system may set the data structure as the solution and generate a notification indicating that the data structure is available.

Figure 8:
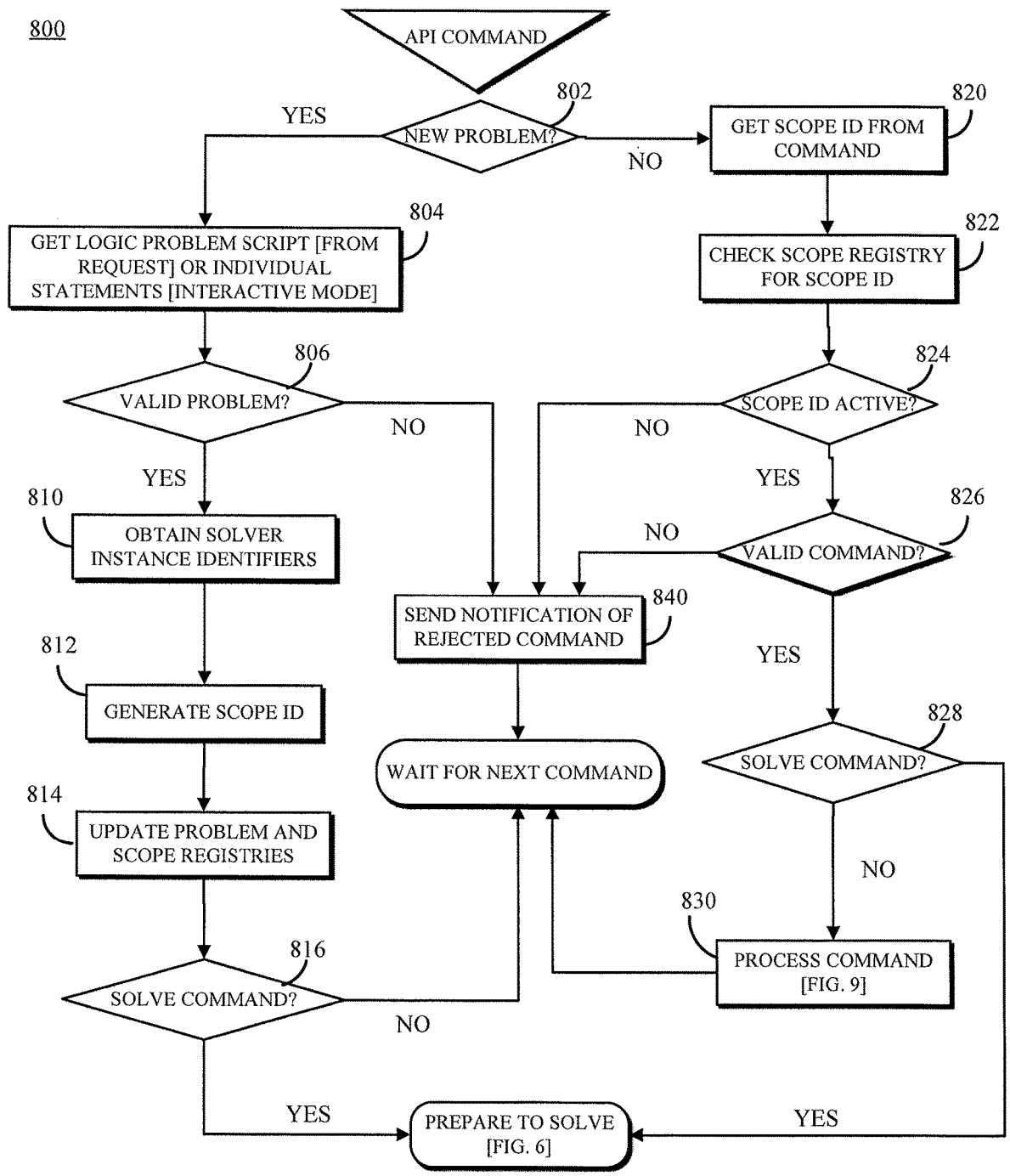
FIG. 8 is a flowchart illustrating an example method of processing API commands as solver commands in accordance with the present disclosure.

As described above, the system may provide one or more APIs for clients to use the constraint solver service. For example, the system may provide, to a computing device associated with the user and in communication with the system via the internet, the API as a web interface that enables the user to transmit, to the system as a first user input, the first set of problem statements and settings identifying the one or more solvers. The API may enable the user to input other commands as well, such as solver commands that control computation in the input/output language that a particular solver is configured to interpret. FIG. 8 illustrates an example method 800 that can be performed by the system (i.e., by processors executing program instructions to implement a constraint solver service) to receive and process commands entered into the API in association with the requested evaluation of the logic problem, before any encodings are pushed to the solver instances (i.e., at step 626 or otherwise before step 634 of FIG. 6). At 802, upon receipt of an API command, the system may determine whether the command is a request to enter new problem statements or a request to execute a control command associated with evaluating the logic problem.

If the request is to enter new problem statements, at 804 the system may obtain the logic problem. In some embodiments, the logic problem may be submitted in batch (e.g., as a script of problem statements). In other embodiments, the system may operate the API in an "interactive mode" in which the problem statements may be submitted by the client (and optionally pushed to the "stack" of statements on each solver) one at a time. For example, the system may: provide, via the API, a prompt to enter individual problem statements of the logic problem; receive, via the API, a plurality of inputs entered in a sequence in response to the prompt; obtain, from each input of the plurality of inputs, a corresponding problem statement of a plurality of problem statements together forming at least a portion of the logic problem; and, create at least one encoding comprising the plurality of problem statements arranged in the sequence. At 806, the system may determine whether the received logic problem/encoding/set of problem statements comprises a valid logic problem. In various embodiments, a logic problem may be "valid" if the input problem statements are readable (or can be made readable via encoding) by the selected solvers; further the logic problem may be invalid if the input problem statements include any solver commands that are disallowed from a logic problem definition. For example, in some embodiments the problem source may be prohibited from including the solve command in the logic problem itself. If the entered logic problem is not valid, the system may proceed to 840, generating and sending a notification that the submitted API command is rejected; the notification may include the reason the command was rejected (e.g., notification includes an HTTP code 400 "Bad Request").

If the logic problem is valid, at 810 the system may obtain the physical identifiers for the solver instances that have been deployed to solve the logic problem. For example, the system may query the container management service for the physical identifier assigned to each container instance when the container instance is provisioned. At 812, the system may generate a scope identifier for the primary scope of the logic problem, and at 814 the system may update the corresponding registries with the information associated with the logic problem. For example, the system may generate a hash value for the logic problem as described above, and may create and store a problem registry record indicating the logic problem is being evaluated; and, the system may store the scope identifier, solver instance physical identifiers, and logic problem/problem registry identifier in a new scope record in the scope registry.

In some embodiments, the API command may validly include the solve command. For example, the API may be a command-line interface, and the user may submit an API command that causes the system to append the solve command to the end of the logic problem specified in the request. At 816, the system may determine whether the API command includes the solve command. If so, the system continues preparing the deployed solvers to evaluate the logic problem (i.e., by returning to 628 or 634 of FIG. 6). If there is no solve command, the system has finished processing the API command and may wait for the next command.

As described above, the deployed solvers may interpret various input/output languages, such as SMT-LIB, that each include a set of solver commands that control solver execution. If at 802 the system determines that the API command is a control command, the system may determine that the control command corresponds to a particular command within each relevant set of solver commands—that is, the received control command is a command that each deployed solver can interpret, either directly or via the system encoding the control command into the appropriate input/output language. For example, the system may determine that the received command is to "append," and may determine that "append" corresponds to the SMT-LIB "push" command. Some solver commands may be prohibited at various points in the deployment and evaluation processes. As such, with the corresponding commands identified, the system may need to determine the execution state of one or more of the corresponding solvers executing on the N solver instances, and then determine whether the identified commands can be issued when any of the corresponding solvers are in the determined execution state. That is, in some embodiments, if any one of the solvers is in an execution state where it cannot process the corresponding command, the control command should not be issued to any of the solvers.

The illustrated method 800 provides some examples of determining, based on the execution state, whether the control command should be accepted (i.e., determined valid and then issued to the solvers) or rejected. At 820, the system may determine that the API command includes a scope identifier, and may obtain the scope identifier from the command. At 822, the system may compare the scope identifier to the scope identifiers of the scope records in the scope registry to determine (824) whether the scope identifier identifies an active scope. If there is no match to the scope identifier in the scope registry, the API command is invalid and is rejected (840). If the scope identifier does appear in one of the scope records, the system determines whether the corresponding scope is the active scope—that is, the scope identifier identifies the scope for the logic problem that is being evaluated and does not have a child scope. In other words, as described herein, when a child scope is created its parent scope is rendered inactive—the execution states of the deployed solvers are updated accordingly. If the identified scope is not the active scope, the API command is rejected (840).

If the scope identifier identifies the active scope, at 826 the system may determine whether the control command is validly formatted and can be issued to the solvers in the present execution state. In some embodiments, the API may be a web interface that generates, as the API command(s), HTTP commands such as PUT, POST, GET, and DELETE; some commands in the solver command sets may only be validly requested using certain HTTP commands. For example, a user may be allowed to use POST requests to issue any solver commands other that solve commands, child scope creation commands, and child scope deletion commands; these commands are validly issued to a specific scope identifier using PUT or DELETE requests. Further, even if a command is validly formatted, it may be invalid because it cannot be issued when a solver is in the current execution state. For example, if the deployed solvers are executing against the logic problem associated with the scope identifier in the command (i.e., the solve command was issued and the solvers have not finished computing results), the system may reject (840) any command submitted via a POST request, even if the command is validly formatted.

Responsive to a determination that the solver command is valid and can be issued, the system may determine (828) whether the solver command is the solve command, and may prepare to continue evaluating the logic problem (i.e., by returning to 628 of FIG. 6) if so. If the solver command is another command, at 830 the system may cause the corresponding solver of each of the N solver instances to execute the command. Non-limiting examples of processing the command in this manner are described below with respect to FIG. 9. Responsive to a determination that the command cannot be issued, the system may provide, via the API, an error message indicating that the request is rejected (840). An example subset of control commands that can be submitted via a RESTful web interface, such as a console or a command line interface, may include the following HTTP requests and their corresponding SMT-LIB interpretations and processing restrictions:

POST solver/scope?ttl={timeToLiveMinutes}: creates a new scope with the specified time to live, and returns its scope id. The scope runs an instance of each of the solver configurations specified in the "solvers" field of the request body (see example request above), which are initialized using the SMT-LIB statements specified in the optional "problem" field, if present.

PUT solver/scope/{scopeId}/push?ttl={timeToLiveMinutes}: returns a new child scope id that is initialized with the contents of the parent scope with id scopeId. An optional time to live is specified, and otherwise the parent's time to live is employed. Request directed to the parent scope (including a new "push" request") will fail with status 409 until the new scope is deleted with the corresponding request. Subsequent calls will return the same child scope.

DELETE solver/scope/{scopeId}: deletes the specified scope, which re-enables its parent scope, if that was a child scope. This also deletes all resources associated to this scope, like check-sat or getmodel resources.

POST solver/scope/{scopeId}/command: executes the SMT-LIB command specified in the request body in the specified scope. Some commands like pop, push, check-sat, or get-model, or getassertions are rejected with a 400 status code. If the computation of check-sat or get-model for this resource is running this fails with 409 status.

PUT solver/scope/{scopeId}/check-sat?timeout={timeoutSeconds}: triggers computation of the command (check-sat) for the specified scope. The computation will be aborted on each solver configuration if a solution is not computed within the specified timeout.

PUT solver/scope/{scopeId}/get-model?timeout={timeoutSeconds}& {NUM}: triggers the computation of the command (get-model) for the specified scope, with the specified timeout. Up to NUM models are attempted to be calculated on each configured solver. The computation will be aborted on each solver configuration if all models are not computed within the specified timeout. If timeout is reached before computing all the models, the models computed so far will still be available in the corresponding GET request.

POST solver/check-sat?timeout={timeoutSeconds}& ttl={timeToLiveMinutes}: creates a new scope with the specified time to live, for the SMT-LIB script resulting from adding a (check-sat) statement at the end of problem specified in the request body, and triggers the computation of the check-sat resource for that scope. Returns the id of the new scope. The new scope is immutable, and posting a command to that scope will fail with 412 status.

POST solver/get-model?timeout={timeoutSeconds}& ttl={TTLMinutes}& {NUM}: same as "POST solver/check-sat", but instead of adding a (check-sat) statement, it triggers the computation of up to NUM models for the specified problem.

GET solver/scope/{scopeId}/check-sat: returns a JSON blob with a field "status" for the computation status (in progress, success, timeout, error). In case the problem execution has completed, an additional field "result" contains the result (e.g., 'sat,"unsat,"unknown'). Additional metadata can be requested by using optional query string parameters. If this computation was not previously launched with the corresponding request, an 404 status code is returned.

GET solver/scope/{scopeId}/get-model?size= {pageSize}&from={numEntriesToSkip}: similar to "GET solver/scope/{scopeId}/check-sat" but for computing a model, and with additional query string parameters for pagination of the set of models.

DELETE solver/scope/{scopeId}/check-sat, DELETE solver/scope/{scopeId}/get-model can be used to cancel the corresponding computations.

GET solver/scope/{scopeId}/get-assertions: returns the assertions (i.e., problem statements) active for a scope, as a JSON blob.

Figure 9:
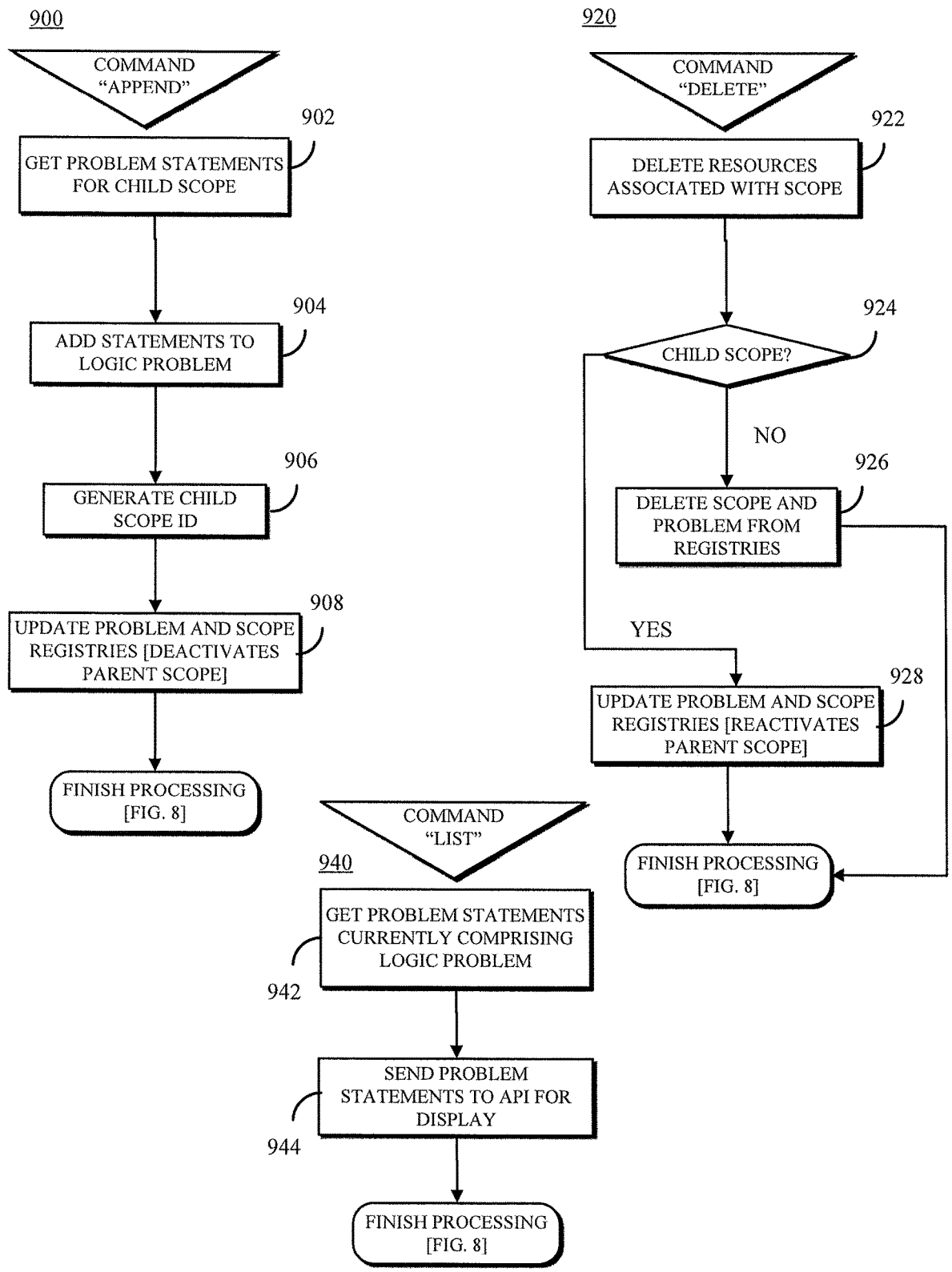
FIG. 9 is a set of flowcharts illustrating example methods of processing control commands as solver commands in accordance with the present disclosure.

FIG. 9 illustrates several example methods 900, 920, 940 that can be performed by the system (i.e., by processors executing program instructions to implement a constraint solver service) to process particular solver commands (e.g., received via the API). Method 900 describes processing an "append" command (in some embodiments corresponding to the SMT-LIB "push" command) for adding one or more problem statements to the logic problem; for example, the system may append an additional set of problem statements to the existing stack of problem statements in the logic problem. In some embodiments, as illustrated, this involves creation of a child stack and subsequent management of the child stack as the active stack. At 902, the system may receive the problem statements comprising the child scope, such as via the API or by receiving a file as described above. At 904, the system may add the subset of problem statements (one at a time, if received in interactive mode, or via batch processing) to the logic problem. For example, the system may encode the child scope problem statements using the encoding parameters of the primary stack of statements, and may send the encodings to the deployed solvers as described above. At 906, the system may generate a new scope identifier for the child scope, and at 908 the system may update the corresponding records for the logic problem in the problem registry and the scope registry. For example, the system may add the child scope identifier to the corresponding scope record, which serves as an indication that the previously active scope (i.e., the primary scope or a previously created child scope) is no longer active, and the new child scope is the active scope. The system may then finish processing the API command (e.g., by returning to FIG. 8 to await the next API command).

Method 920 describes processing a "delete" command (in some embodiments, corresponding to the SMT-LIB "pop" command) for removing problem statements that are added with the "append" command. In embodiments where appending problem statements includes creating a child scope associated with the new subset of child statements, removing the appended statements may constitute deleting the associated child scope. Thus, at 922 the system may delete or otherwise release any virtual computing resources (e.g., data storage storing data produced by processing the active scope) associated with the active scope. At 924, the system may determine whether the active scope is a child scope. For example, the system may use the scope identifier contained in the delete command to query the scope registry and identify the scope record that contains the scope identifier (this may have already been performed, e.g. at 820 and 822 of FIG. 8); the system may determine whether the matching scope record identifies the active scope as a child of a parent scope associated with the logic problem. If not, the active scope is the primary scope, and at 926 the system deletes the scope (e.g., by removing the corresponding scope record from the scope registry) and may further remove the logic problem as an actively evaluated problem (e.g., by deleting the corresponding record in the problem registry, or by updating the record to indicate that any previously cached solution computing for the problem is present in the cache). If the scope to be deleted is a child scope, at 928 the system may remove the child scope and reactivate its parent scope by updating the corresponding records in the problem and scope registries. The system may then finish processing the API command.

Method 940 describes processing a "list" command by returning a list of the problem statements currently comprising the logic problem. In some embodiments, the "list" command may correspond to the SMT-LIB "get-assertions" command. At 942, the system may obtain the set of problem statements currently comprising the logic problem; this set may include the originally submitted "primary" set of problem statements, plus the subset(s) of problem statements appended via creation of any existing child scope(s). In some embodiments, the system may convert the "list" command to the corresponding solver commands for the solvers, and may directly obtain a list of the problem statements presently in the stack; alternatively, the system may obtain the problem statements from the corresponding record(s) in the problem registry. At 944, the system may send the obtained set of problem statements to the API for display to the user, and may then finish processing the API command.

Figure 10:
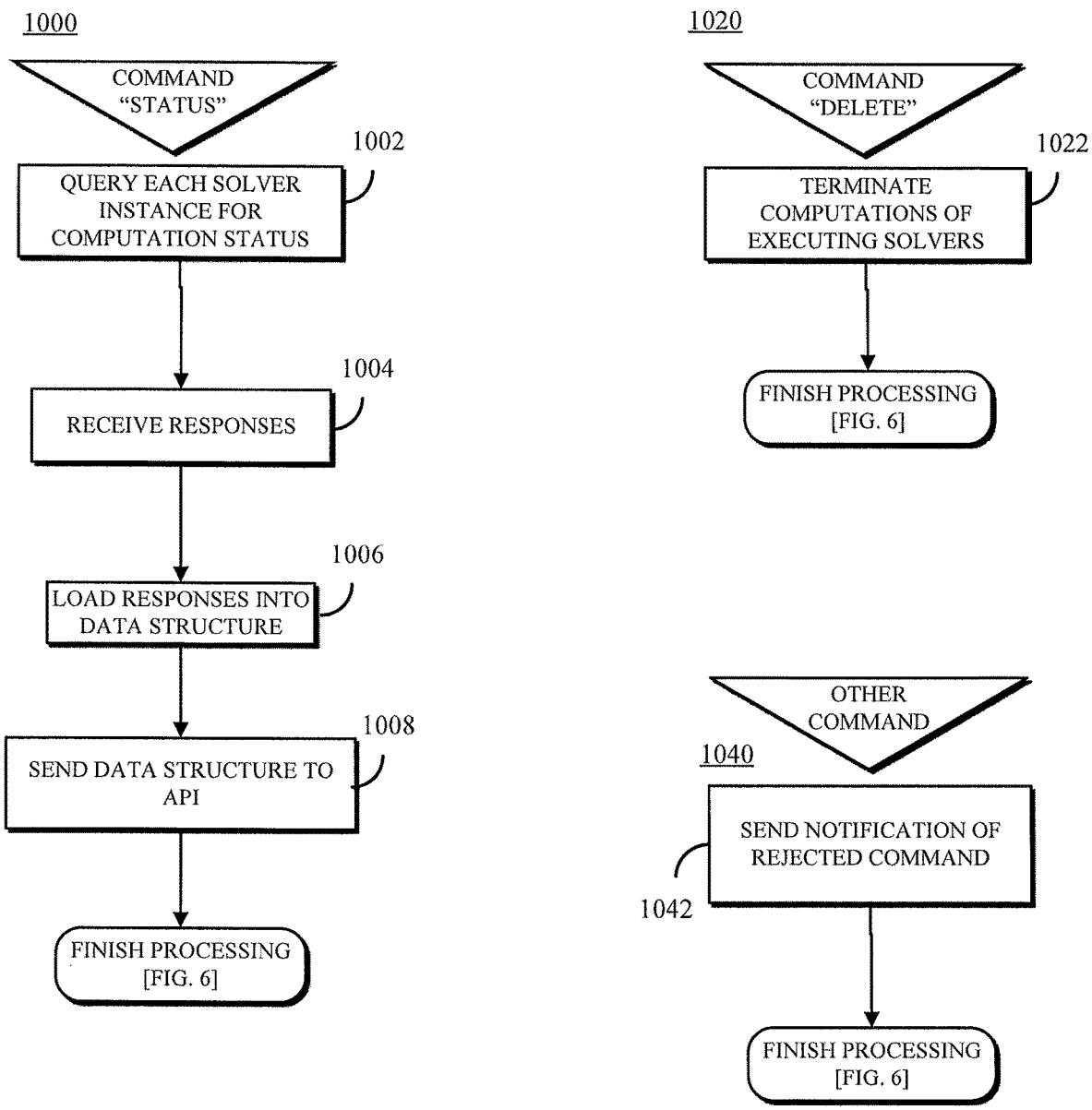
FIG. 10 is a set of flowcharts illustrating example methods of processing additional control commands as solver commands in accordance with the present disclosure.

FIG. 10 illustrates several example methods 1000, 1020, 1040 that can be performed by the system (i.e., by processors executing program instructions to implement a constraint solver service) to receive and process commands entered into the API in association with the requested evaluation of the logic problem, while the evaluation is underway (i.e., at step 638 or otherwise while at least one of the deployed solvers is computing a solution to the logic problem). Method 1000 describes processing a "status" command for obtaining the current status of each solver (e.g., "computing," "done," "error," or the result). Upon receiving the command, at 1002 the system may issue the corresponding solver command to each of the executing solvers, such as via remote procedure calls to the solver instances' endpoints. At 1004 the system may receive the sovlers' responses, and at 1006 may create a data structure storing the corresponding responses. At 1008 the system may send the data structure to the API for display to the user, and may continue processing subsequent commands per the method of FIG. 6. Method 1020 describes processing a "delete" command (as in method 920 described above) wherein the system, at 1022, terminates the computations underway. For example, the system may which solvers have not yet produced a result and thus are still executing, and may issue a "stop" command to those solvers, causing the solvers to abort their computations. Method 1040 describes processing any other command during computation, which is considered an invalid command and at 1042 is rejected by the system as described above with respect to FIG. 8.

Figure 11:
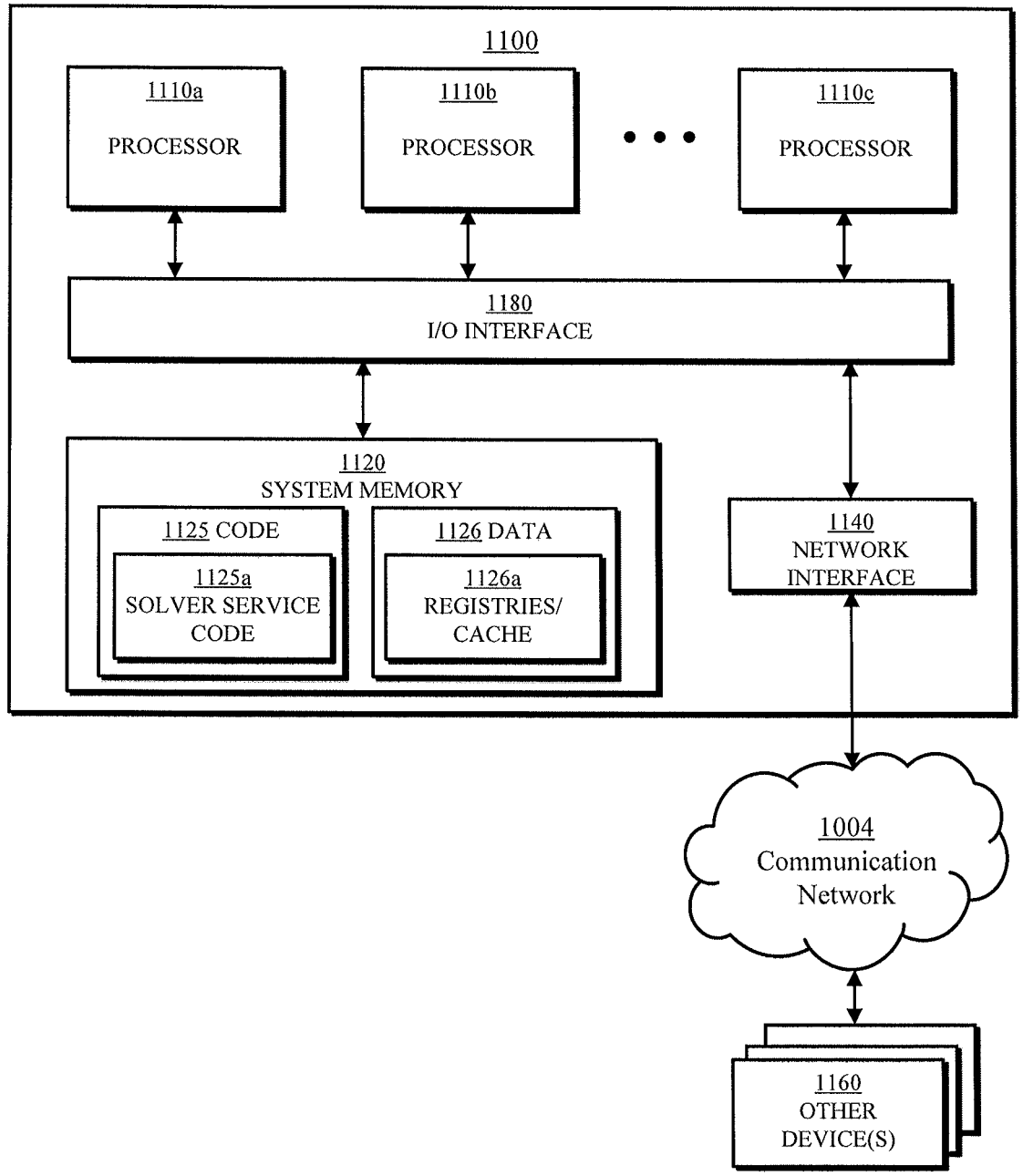
FIG. 11 is a diagram of a computing environment including an example computing device specially configured to implement the presently described systems and methods.

In at least some embodiments, a computing device that implements a portion or all of one or more of the technologies described herein, including the techniques to implement the functionality of a system for deploying and executing constraint solvers to solve a logic problem, can include one or more computer systems that include or are configured to access one or more computer-accessible media. FIG. 11 illustrates such a computing device 1100. In the illustrated embodiment, computing device 1100 includes one or more processors 1110*a*, 1110*b*, . . . , 1110*n* (which may be referred herein singularly as "a processor 1110" or in the plural as "the processors 1110") coupled to a system memory 1120 via an input/output (I/O) interface 1180. Computing device 1100 further includes a network interface 1140 coupled to I/O interface 1180.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, Power PC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 1120 as code 1125 and data 1126. The code 1125 may particularly include program code 1125*a* and/or other types of machine-readable instructions executable by one, some, or all of the processors 1110*a-n* to implement the present solver service; similarly, the data 1126 may particularly include solver service data 1126*a* such as any of the registries and cache layers described above.

In one embodiment, I/O interface 1180 may be configured to coordinate I/O traffic between processor(s) 1110*a-n*, system memory 1120, and any peripheral devices in the device, including network interface 1140 or other peripheral interfaces. In some embodiments, I/O interface 1180 may perform any necessary protocol, timing, or other data transformations to convert data signals from one component (e.g., system memory 1120) into a format suitable for use by another component (e.g., processor(s) 1110*a-n*). In some embodiments, I/O interface 1180 may include support for devices attached through various types of peripheral buses, such as a variant of the Peripheral Component Interconnect (PCI) bus standard or the Universal Serial Bus (USB) standard, for example. In some embodiments, the function of I/O interface 1180 may be split into two or more separate components, such as a north bridge and a south bridge, for example. Also, in some embodiments some or all of the functionality of I/O interface 1180, such as an interface to system memory 1120, may be incorporated directly into processor 1110.

Network interface 1140 may be configured to allow data to be exchanged between computing device 1100 and other device or devices 1160 attached to a network or network(s) 1150, such as user computing devices and other computer systems described above, for example. In various embodiments, network interface 1140 may support communication via any suitable wired or wireless general data networks, such as types of Ethernet networks, for example. Additionally, network interface 1140 may support communication via telecommunications/telephony networks, such as analog voice networks or digital fiber communications networks, via storage area networks, such as Fiber Channel SANs or via any other suitable type of network and/or protocol.

In some embodiments, system memory 1120 may be one embodiment of a computer-accessible medium configured to store program instructions and data for implementing embodiments of the present methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1100 via I/O interface 1180. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals such as electrical, electromagnetic or digital signals, conveyed via a communication medium such as a network and/or a wireless link, such as may be implemented via network interface 1140. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, as further described by example below.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

Figure 12:
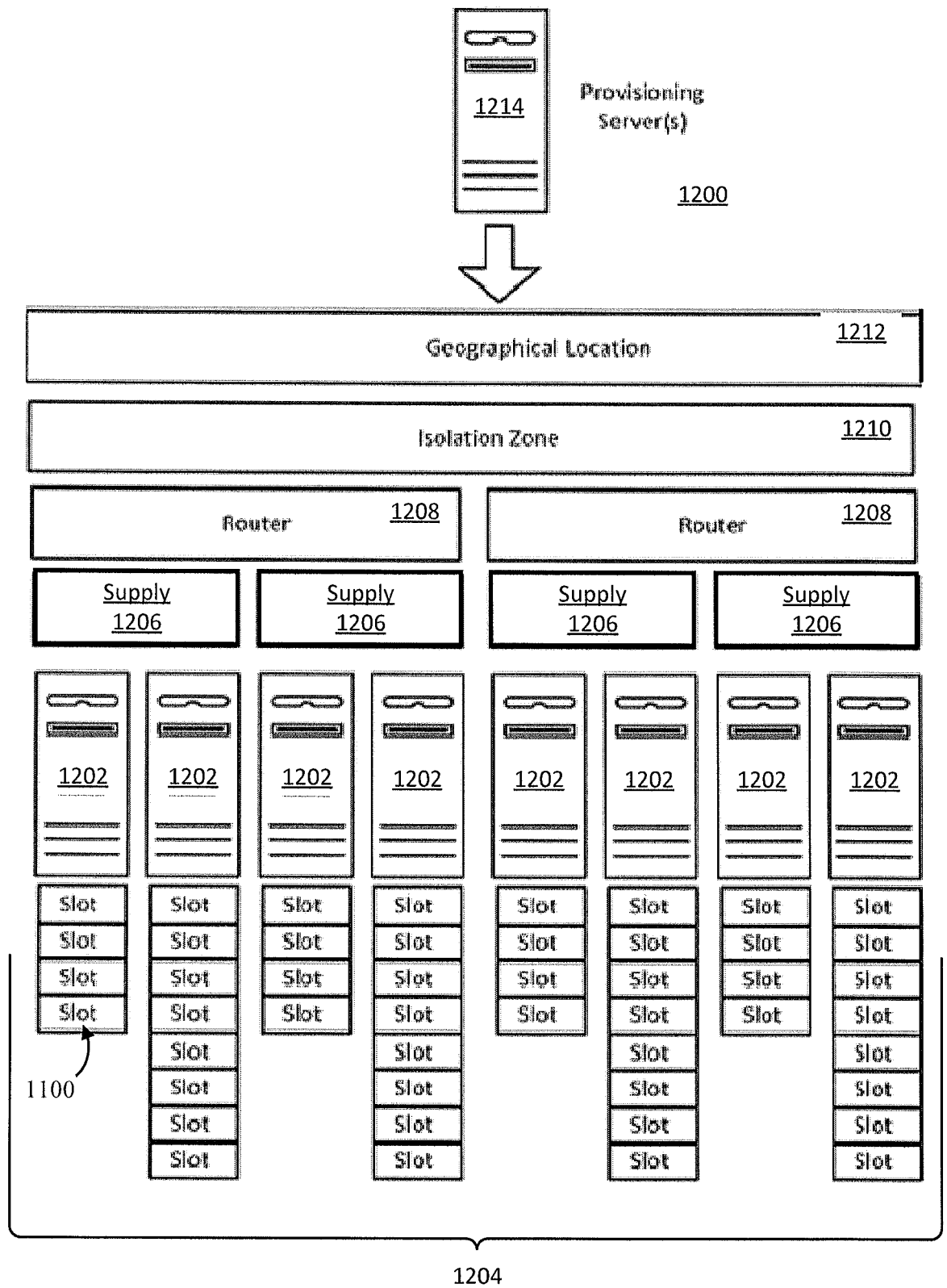
FIG. 12 is a diagram of another computing environment including physical and virtual computing resources configured to support the implementation of the presently described systems and methods across a distributed computing network.

In some embodiments, such as in FIG. 12, a data center 1200 may be viewed as a collection of shared computing resources and/or shared infrastructure. For example, as shown in FIG. 12, a data center 1200 may include virtual machine slots 1204, physical hosts 1202, power supplies 1206, routers 1208, isolation zone 1210, and geographical location 1212. A virtual machine slot 1204 may be referred to as a slot or as a resource slot. A physical host 1202 may be shared by multiple virtual machine slots 1204, each slot 1204 being capable of hosting a virtual machine, such as a guest domain. Multiple physical hosts 1202 may share a power supply 1206, such as a power supply 1206 provided on a server rack. A router 1208 may service multiple physical hosts 1202 across several power supplies 1206 to route network traffic. An isolation zone 1210 may service many routers 1208, the isolation zone 1210 being a group of computing resources that may be serviced by redundant resources, such as a backup generator. Isolation zone 1210 may reside at a geographical location 1212, such as a data center 1200. A provisioning server 1214 may include a memory and processor configured with instructions to analyze user data and rank available implementation resources using determined roles and shared resources/infrastructure in the calculation. The provisioning server 1214 may also manage workflows for provisioning and deprovisioning computing resources as well as detecting health and/or failure of computing resources.

A provisioning server 1214 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 1202 that shares a router 1208 with a second system may be more proximate to the second system than to a third system only sharing an isolation zone 1210. Depending on an application, it may be desirable to keep the distance low to increase throughput or high to increase durability. In another embodiment, the distance may be defined in terms of unshared resources. For example, two slots 1204 sharing a router 1208 may have a distance of a physical host 1202 and a power supply 1206. Each difference in resources may be weighted differently in a distance calculation.

A placement calculation may also be used when selecting a prepared resource to transfer to a client account. In one embodiment, a client requests a virtual machine having an operating system. The provisioning server 1214 may determine that the request may be satisfied with a staged volume in a slot 1204. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 1214 may determine that a placement near other existing volumes is desirable for latency concerns. Therefore, the decision may find that sharing a router 1208 is desirable but sharing a supply 1206 and physical host 1202 is undesirable. A volume in the pool may then be selected that matches these attributes and placed preferably on a same router 1208 as the other volumes but not the same physical host 1202 or power supply 1206. In other examples of placement decisions, such as those relating to a database shard, sharing of infrastructure may be less desirable and a volume may be selected that has less infrastructure in common with other related volumes.

Thus, in one aspect, this disclosure provides a system including one or more processors and memory storing computer-executable instructions that, when executed by the one or more processors, cause the system to: receive a first request to evaluate a logic problem associated with a problem source, wherein the problem source is one of a user of a computing resource service provider, and a service of the computing resource service provider; determine that the first request includes a first set of problem statements describing at least a first portion of the logic problem; select, based at least in part on the first request, one or more solvers from a plurality of available constraint solvers configured to be installed by the system; and, communicate with a container management system of the computing resource service provider. The system causes the container management system to: obtain one or more container images each associated with a corresponding solver of the one or more solvers, the one or more container images each containing software and data needed to install the corresponding solver; provision available virtual computing resources of the computing resource service provider as a plurality of container instances; install one of the one or more container images into each of the plurality of container instances to produce a plurality of solver instances each configured to operate one of the one or more solvers as an executable program, such that each of the one or more solvers corresponds to at least one of the plurality of solver instances; and, deploy the plurality of solver instances into a virtual computing environment of the computing resource service provider. The instructions, when executed by the one or more processors, further cause the system to: send the first set of problem statements to each of the plurality of solver instances; send to each of the plurality of solver instances a solve command that causes the corresponding solver operated by the solver instance to evaluate the logic problem and produce a corresponding result; obtain a first result produced by a first solver of the one or more solvers, the first solver operated by a first solver instance of the plurality of solver instances; and, perform an action associated with obtaining the first result.

To perform the action, the instructions, when executed, may cause the system to: determine that the first result is produced before the corresponding result of any other solver instance of the plurality of solver instances; send a notification to the problem source indicating that the first result is available; and send, to each of the plurality of solver instances other than the first solver instance, a terminate command that causes the corresponding solver operated by the solver instance to stop evaluating the logic problem. Operation of the first solver may be configurable by setting values of a set of configuration parameters, and prior to sending the solve command to the plurality of solver instances, the instructions, when executed, may further cause the system to: determine, based at least in part on the first request, a first configuration of the set of configuration parameters and a second configuration of the set of configuration parameters; determine that a second solver instance of the plurality of solver instances is configured to operate the first solver; cause the first solver instance to operate the first solver using the first configuration; and, cause the second solver instance to operate the first solver using the second configuration.

Where the user is the problem source, the instructions, when executed, may further cause the system to: provide, to a computing device associated with the user and in communication with the system via the internet, a web interface that enables the user to transmit, to the system as a first user input, the first set of problem statements and settings identifying the one or more solvers; receive the first user input as the first request; and, select the one or more solvers using the settings. The web interface may further enable the user to transmit to the system, as a second user input, a second set of problem statements describing a second portion of the logic problem, and the solve command as a third user input, and the instructions, when executed, may further cause the system to: receive the second user input; determine, based on the second user input, that the second set of problem statements is associated with the logic problem; send, to each of the plurality of solver instances, the second set of problem statements and an append command that causes the solver instance to combine the first and second sets of problems statements as the logic problem to be evaluated; and, receive the third user input, wherein the system sends the solve command to the plurality of solver instances in response to receiving the third user input.

In another aspect, the present disclosure provides a system including one or more processors and memory storing, for each of a plurality of available constraint solvers configured to be installed by the system, corresponding software resources needed to install the available constraint solver as an executable program. The memory further stores computer-executable instructions that, when executed by the one or more processors, cause the system to: obtain a logic problem; determine a number N of solver instances to be used to evaluate the logic problem; determine, based on requirements associated with at least one of the plurality of available constraint solvers, one or more encodings of the logic problem; select one or more solvers from the plurality of available constraint solvers; using the corresponding software resources of the one or more solvers, instantiate N solver instances in a virtual computing environment, each solver instance of the N solver instances including virtual computing resources configured to execute a corresponding solver of the one or more solvers and storing a corresponding encoding, of the one or more encodings, that is readable by the corresponding solver; send to each of the N solver instances a solve command that causes the corresponding solver executing on the solver instance to evaluate the corresponding encoding and produce a corresponding result describing one of a plurality of solutions to the logic problem; obtain a first result produced by a first solver of the one or more solvers from a first encoding of the one or more encodings; and, perform an action associated with obtaining the first result.

Executing the instructions may further cause the system to generate the first encoding as a first set of problem statements representing the logic problem and formatted in a first format readable by the first solver, and generate a second encoding of the one or more encodings, the second encoding comprising a second set of problem statements representing the logic problem and formatted in a second format readable by a second solver of the one or more solvers, the second solver executing on a second solver instance of the N solver instances, the second solver instance storing the second encoding. Additionally or alternatively, executing the instructions may further cause the system to: generate the first encoding as a first set of problem statements representing the logic problem and formatted in a first format readable by the first solver; and, generate a second encoding of the one or more encodings, the second encoding including a second set of problem statements representing the logic problem and formatted in the first format, the second set of problem statements being different from the first set of problem statements, the second encoding being evaluated by the first solver executing on a second solver instance of the N solver instances.

To instantiate the N solver instances, the instructions, when executed, may cause the system to: determine a first configuration of a set of configuration parameters and a second configuration of the set of configuration parameters, the set of configuration parameters being associated with the first solver; install the first solver on both a first solver instance and a second solver instance of the number of solver instances; apply the first configuration to the first solver on the first solver instance; and, apply the second configuration to the first solver on the second solver instance, the first and second configurations causing the first solver to evaluate the logic problem using different features of the first solver. The first configuration may configure the first solver to produce a Boolean result, and the second configuration may configure the first solver to produce one or more models. To perform the action, the instructions, when executed, may cause the system to: responsive to obtaining the first result, generate a first notification accessible by a problem source associated with the logic problem and in communication with the system, the first notification including the first result; determine that the first solver executing on the second solver instance has finished producing the one or more models; obtain the one or more models; and, responsive to obtaining the one or more models, generate a second notification accessible by the problem source, the notification including or referencing the one or more models.

The first result may be associated with a first solver instance of the N solver instances, and may be produced before the corresponding result of any other solver instance of the N solver instances. To perform the action, the instructions, when executed, may cause the system to: generate a notification indicating that the first result is available; and send, to each of the N solver instances other than the first solver instance, a terminate command that causes the corresponding solver executing on the solver instance to abort execution of the solve command and delete stored solution data created by the execution of the solve command. Additionally or alternatively, each of the one or more solvers may produce, as the corresponding result, a value selected from the group consisting of: a positive value indicating the logic problem is satisfiable; a negative value indicating the logic problem is unsatisfiable; and, an error value indicating the solver execution failed or the solver could not determine satisfiability. To perform the action, the instructions, when executed, may cause the system to: receive the corresponding result produced by the corresponding solver of each remaining solver instance of the N solver instances; compare the N corresponding results to each other to determine agreement; responsive to a determination that the N corresponding results are all an agreed value, generate a notification including the agreed value; and, responsive to a determination that the N corresponding results are not all the same value, generate a notification indicating a valid solution was not found.

To perform the action, the instructions, when executed, may cause the system to: receive the corresponding result produced by the corresponding solver of each remaining solver instance of the N solver instances; create a data structure storing each of the N corresponding results associated with identifying information of the corresponding solver that produced the result; and, generate a notification indicating that the data structure is available. The instructions, when executed, may further cause the system to: receive one or more messages associated with the virtual computing environment and including or referencing the N instance identifiers each associated with a corresponding solver instance of the N solver instances; responsive to receiving the one or more messages, generate a first scope identifier and store, in the memory, a scope record containing the first scope identifier and the N instance identifiers, the system using the scope record to identify the N solver instances dedicated to the logic problem and a first state of the corresponding solvers' evaluation of the logic problem; receive a request to add one or more problem statements to the logic problem; send, to each of the N solver instances, the one or more problem statements and an append command that causes the solver instance to include the one or more problem statements with the corresponding encoding as the logic problem; generate a second scope identifier; update the scope record to include the second scope identifier and associate the second scope identifier as a child of the first scope identifier; subsequent to updating the scope record, receive a first command to perform a solver task; determine that the first command uses the first scope identifier to identify resources affected by the solver task; and, reject the first command. The instructions, when executed, may further cause the system to: receive a second command to delete resources associated with the second scope identifier; cause the N solver instances to delete the one or more problem statements; update the scope record to remove the second scope identifier; and subsequent to updating the scope record, resume accepting commands that use the first scope identifier to identify resources.

In yet another aspect, the present disclosure provides a system including one or more processors and memory storing computer-executable instructions that, when executed by the one or more processors, cause the system to: receive, via an application programming interface (API), a request to evaluate a logic problem; obtain, based at least in part on the request, one or more encodings of the logic problem; select one or more solvers from a plurality of available constraint solvers that the system is configured to install; cause a number N of solver instances to be instantiated in a virtual computing environment, each solver instance of the N solver instances including virtual computing resources configured to execute a corresponding solver of the one or more solvers and storing a corresponding encoding, of the one or more encodings, that is readable by the corresponding solver; obtain a first result produced by a first solver, of the one or more solvers, executing on a first solver instance of the N solver instances, the first solver evaluating a first encoding of the one or more encodings to produce the first result; determine, based at least in part on the first result, a solution to the logic problem; and provide, via the API, information describing the solution.

The one or more encodings may conform to an input/output language that the one or more solvers are configured to interpret, the input/output language comprising a set of solver commands that control solver execution, and executing the instructions may further cause the system to: receive, via the API, a control command associated with evaluating the logic problem; determine that the control command corresponds to a first command of the set of solver commands; determine an execution state of at least one of the corresponding solvers executing on the N solver instances; determine whether the first command can be issued when any of the corresponding solvers are in the execution state; responsive to a determination that the first command can be issued, cause the corresponding solver of each of the N solver instances to execute the first command; and, responsive to a determination that the first command cannot be issued, provide, via the API, an error message indicating that the request is rejected. To obtain the one or more encodings, the instructions, when executed by the one or more processors, may cause the system to: provide, via the API, a prompt to enter individual problem statements of the logic problem; receive, via the API, a plurality of inputs entered in a sequence in response to the prompt; obtain, from each input of the plurality of inputs, a corresponding problem statement of a plurality of problem statements together forming at least a portion of the logic problem, the plurality of problem statements having a format that is readable by the first solver; and, create the first encoding to embody the plurality of problem statements arranged in the sequence.

To select the one or more solvers, the instructions, when executed by the one or more processors, may cause the system to: provide, via the API, a prompt to identify desired solvers and solver configurations for evaluating the logic problem; receive, via the API, input data entered in response to the prompt; and, determine that the input data identifies the one or more solvers. To cause the N solver instances to be instantiated, the instructions, when executed by the one or more processors, may cause the system to determine that the input data further comprises a first configuration of a set of configuration parameters associated with the first solver, and cause the first solver to be installed on the first solver instance such that the first solver evaluates the first encoding according to the first configuration of the set of configuration parameters. The instructions, when executed by the one or more processors, may further cause the system to: provide, via the API, a prompt to identify a solution strategy; receive, via the API, input data entered in response to the prompt; and, to determine the solution to the logic problem, process one or more of the N corresponding results, including the first result, according to the identified solution strategy to produce the solution.

The various embodiments described herein can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. Other variations are within the spirit of this disclosure. Thus, while the disclosed techniques contemplate various modifications and alternative constructions, example embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:
    receive a first request to evaluate a logic problem associated with a problem source, wherein the problem source is one of a user of a computing resource service provider, and a service of the computing resource service provider;
    determine that the first request includes a first set of problem statements describing at least a first portion of the logic problem;

select, based at least in part on the first request, one or more solvers from a plurality of available constraint solvers configured to be installed by the system;

communicate with a container management system of the computing resource service provider to cause the container management system to:

obtain one or more container images each associated with a corresponding solver of the one or more solvers, the one or more container images each comprising software and data needed to install the corresponding solver;

provision available virtual computing resources of the computing resource service provider as a plurality of container instances;

install one of the one or more container images into each of the plurality of container instances to produce a plurality of solver instances each configured to operate one of the one or more solvers as an executable program, such that each of the one or more solvers corresponds to at least one of the plurality of solver instances; and deploy the plurality of solver instances into a virtual computing environment of the computing resource service provider;

send the first set of problem statements to each of the plurality of solver instances;

send to each of the plurality of solver instances a solve command that causes the corresponding solver operated by the solver instance to evaluate the logic problem and produce a corresponding result;

obtain a first result produced by a first solver of the one or more solvers, the first solver operated by a first solver instance of the plurality of solver instances; and perform an action associated with obtaining the first result.

2. The system of claim 1, wherein to perform the action, the instructions, when executed, cause the system to:

determine that the first result is produced before the corresponding result of any other solver instance of the plurality of solver instances;

send a notification to the problem source indicating that the first result is available; and send, to each of the plurality of solver instances other than the first solver instance, a terminate command that causes the corresponding solver operated by the solver instance to stop evaluating the logic problem.

3. The system of claim 1, wherein operation of the first solver is configurable by setting values of a set of configuration parameters, and prior to sending the solve command to the plurality of solver instances, the instructions, when executed, further cause the system to:

determine, based at least in part on the first request, a first configuration of the set of configuration parameters and a second configuration of the set of configuration parameters;

determine that a second solver instance of the plurality of solver instances is configured to operate the first solver;

cause the first solver instance to operate the first solver using the first configuration; and cause the second solver instance to operate the first solver using the second configuration.

4. The system of claim 1, wherein the user is the problem source and the instructions, when executed, further cause the system to:

provide, to a computing device associated with the user and in communication with the system via the internet, a web interface that enables the user to transmit, to the system as a first user input, the first set of problem statements and settings identifying the one or more solvers;

receive the first user input as the first request; and select the one or more solvers using the settings.

5. The system of claim 1, wherein:

the web interface further enables the user to transmit to the system:

as a second user input, a second set of problem statements describing a second portion of the logic problem; and the solve command as a third user input; and the instructions, when executed, further cause the system to:

receive the second user input;

determine, based on the second user input, that the second set of problem statements is associated with the logic problem;

send, to each of the plurality of solver instances:

the second set of problem statements; and an append command that causes the solver instance to combine the first and second sets of problems statements as the logic problem to be evaluated; and receive the third user input, wherein the system sends the solve command to the plurality of solver instances in response to receiving the third user input.

6. A system, comprising one or more processors and memory storing, for each of a plurality of available constraint solvers configured to be installed by the system, corresponding software resources needed to install the available constraint solver as an executable program, the memory further storing computer-executable instructions that, when executed by the one or more processors, cause the system to:

obtain a logic problem;

determine a number N of solver instances to be used to evaluate the logic problem;

determine, based on requirements associated with at least one of the plurality of available constraint solvers, one or more encodings of the logic problem;

select one or more solvers from the plurality of available constraint solvers;

using the corresponding software resources of the one or more solvers, instantiate N solver instances in a virtual computing environment, each solver instance of the N solver instances comprising virtual computing resources configured to execute a corresponding solver of the one or more solvers and storing a corresponding encoding, of the one or more encodings, that is readable by the corresponding solver;

send to each of the N solver instances a solve command that causes the corresponding solver executing on the solver instance to evaluate the corresponding encoding and produce a corresponding result describing one of a plurality of solutions to the logic problem;

obtain a first result produced by a first solver of the one or more solvers from a first encoding of the one or more encodings; and perform an action associated with obtaining the first result.

7. The system of claim 6, wherein executing the instructions further causes the system to:

generate the first encoding as a first set of problem statements representing the logic problem and formatted in a first format readable by the first solver; and generate a second encoding of the one or more encodings, the second encoding comprising a second set of problem statements representing the logic problem and formatted in a second format readable by a second solver of the one or more solvers, the second solver executing on a second solver instance of the N solver instances, the second solver instance storing the second encoding.

8. The system of claim 6, wherein executing the instructions further causes the system to:
generate the first encoding as a first set of problem statements representing the logic problem and formatted in a first format readable by the first solver; and
generate a second encoding of the one or more encodings, the second encoding comprising a second set of problem statements representing the logic problem and formatted in the first format, the second set of problem statements being different from the first set of problem statements, the second encoding being evaluated by the first solver executing on a second solver instance of the N solver instances.

9. The system of claim 6, wherein to instantiate the N solver instances, the instructions, when executed, cause the system to:
determine a first configuration of a set of configuration parameters and a second configuration of the set of configuration parameters, the set of configuration parameters being associated with the first solver;
install the first solver on both a first solver instance and a second solver instance of the number of solver instances;
apply the first configuration to the first solver on the first solver instance; and
apply the second configuration to the first solver on the second solver instance, the first and second configurations causing the first solver to evaluate the logic problem using different features of the first solver.

10. The system of claim 9, wherein the first configuration configures the first solver to produce a Boolean result and the second configuration configures the first solver to produce one or more models, and to perform the action the instructions, when executed, cause the system to:
responsive to obtaining the first result, generate a first notification accessible by a problem source associated with the logic problem and in communication with the system, the first notification comprising the first result;
determine that the first solver executing on the second solver instance has finished producing the one or more models;
obtain the one or more models; and
responsive to obtaining the one or more models, generate a second notification accessible by the problem source, the notification comprising the one or more models.

11. The system of claim 6, wherein the first result is associated with a first solver instance of the N solver instances, and is produced before the corresponding result of any other solver instance of the N solver instances, and to perform the action, the instructions, when executed, cause the system to:
generate a notification indicating that the first result is available; and
send, to each of the N solver instances other than the first solver instance, a terminate command that causes the corresponding solver executing on the solver instance to abort execution of the solve command and delete stored solution data created by the execution of the solve command.

12. The system of claim 6, wherein:
each of the one or more solvers produces, as the corresponding result, a value selected from the group consisting of:
a positive value indicating the logic problem is satisfiable;
a negative value indicating the logic problem is unsatisfiable; and
an error value indicating the solver execution failed or the solver could not determine satisfiability; and
to perform the action, the instructions, when executed, cause the system to:
receive the corresponding result produced by the corresponding solver of each remaining solver instance of the N solver instances;
compare the N corresponding results to each other to determine agreement;
responsive to a determination that the N corresponding results are all an agreed value, generate a notification comprising the agreed value; and
responsive to a determination that the N corresponding results are not all the same value, generate a notification indicating a valid solution was not found.

13. The system of claim 6, wherein to perform the action, the instructions, when executed, cause the system to:
receive the corresponding result produced by the corresponding solver of each remaining solver instance of the N solver instances;
create a data structure storing each of the N corresponding results associated with identifying information of the corresponding solver that produced the result; and
generate a notification indicating that the data structure is available.

14. The system of claim 6, wherein the instructions, when executed, further cause the system to:
receive one or more messages associated with the virtual computing environment and comprising the N instance identifiers each associated with a corresponding solver instance of the N solver instances;
responsive to receiving the one or more messages, generate a first scope identifier and store, in the memory, a scope record comprising the first scope identifier and the N instance identifiers, the system using the scope record to identify the N solver instances dedicated to the logic problem and a first state of the corresponding solvers' evaluation of the logic problem;
receive a request to add one or more problem statements to the logic problem;
send, to each of the N solver instances:
the one or more problem statements; and
an append command that causes the solver instance to include the one or more problem statements with the corresponding encoding as the logic problem;
generate a second scope identifier;
update the scope record to include the second scope identifier and associate the second scope identifier as a child of the first scope identifier;
subsequent to updating the scope record, receive a first command to perform a solver task;
determine that the first command uses the first scope identifier to identify resources affected by the solver task; and
reject the first command.

15. The system of claim 14, wherein the instructions, when executed, further cause the system to:
receive a second command to delete resources associated with the second scope identifier;

cause the N solver instances to delete the one or more problem statements;
update the scope record to remove the second scope identifier; and
subsequent to updating the scope record, resume accepting commands that use the first scope identifier to identify resources.

16. A system, comprising one or more processors and memory storing computer-executable instructions that, when executed by the one or more processors, cause the system to:
receive, via an application programming interface (API), a request to evaluate a logic problem;
obtain, based at least in part on the request, one or more encodings of the logic problem;
select one or more solvers from a plurality of available constraint solvers that the system is configured to install;
cause a number N of solver instances to be instantiated in a virtual computing environment, each solver instance of the N solver instances comprising virtual computing resources configured to execute a corresponding solver of the one or more solvers and storing a corresponding encoding, of the one or more encodings, that is readable by the corresponding solver;
obtain a first result produced by a first solver, of the one or more solvers, executing on a first solver instance of the N solver instances, the first solver evaluating a first encoding of the one or more encodings to produce the first result;
determine, based at least in part on the first result, a solution to the logic problem; and
provide, via the API, information describing the solution.

17. The system of claim 16, wherein the one or more encodings conform to an input/output language that the one or more solvers are configured to interpret, the input/output language comprising a set of solver commands that control solver execution, and wherein executing the instructions further causes the system to:
receive, via the API, a control command associated with evaluating the logic problem;
determine that the control command corresponds to a first command of the set of solver commands;
determine an execution state of at least one of the corresponding solvers executing on the N solver instances;
determine whether the first command can be issued when any of the corresponding solvers are in the execution state;
responsive to a determination that the first command can be issued, cause the corresponding solver of each of the N solver instances to execute the first command; and
responsive to a determination that the first command cannot be issued, provide, via the API, an error message indicating that the request is rejected.

18. The system of claim 16, wherein to obtain the one or more encodings, the instructions, when executed by the one or more processors, cause the system to:
provide, via the API, a prompt to enter individual problem statements of the logic problem;
receive, via the API, a plurality of inputs entered in a sequence in response to the prompt;
obtain, from each input of the plurality of inputs, a corresponding problem statement of a plurality of problem statements together forming at least a portion of the logic problem, the plurality of problem statements having a format that is readable by the first solver; and
create the first encoding comprising the plurality of problem statements arranged in the sequence.

19. The system of claim 16, wherein:
to select the one or more solvers, the instructions, when executed by the one or more processors, cause the system to:
provide, via the API, a prompt to identify desired solvers and solver configurations for evaluating the logic problem;
receive, via the API, input data entered in response to the prompt; and
determine that the input data identifies the one or more solvers; and
to cause the N solver instances to be instantiated, the instructions, when executed by the one or more processors, cause the system to:
determine that the input data further comprises a first configuration of a set of configuration parameters associated with the first solver; and
cause the first solver to be installed on the first solver instance such that the first solver evaluates the first encoding according to the first configuration of the set of configuration parameters.

20. The system of claim 16, wherein the instructions, when executed by the one or more processors, further cause the system to:
provide, via the API, a prompt to identify a solution strategy;
receive, via the API, input data entered in response to the prompt; and
to determine the solution to the logic problem, process one or more of the N corresponding results, including the first result, according to the identified solution strategy to produce the solution.

* * * * *